US012567205B2

(12) United States Patent
Hur et al.

(10) Patent No.: US 12,567,205 B2
(45) Date of Patent: Mar. 3, 2026

(54) MR SERVICE PLATFORM FOR PROVIDING MIXED REALITY AUTOMOTIVE META SERVICE AND CONTROL METHOD THEREOF

(71) Applicant: LG ELECTRONICS INC., Seoul (KR)

(72) Inventors: In Hur, Seoul (KR); Yujung Jang, Seoul (KR); Kihyung Lee, Seoul (KR); Sunghwan Choi, Seoul (KR); Seungman Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 18/569,418

(22) PCT Filed: Jul. 12, 2022

(86) PCT No.: PCT/KR2022/010102
§ 371 (c)(1),
(2) Date: Dec. 12, 2023

(87) PCT Pub. No.: WO2023/287152
PCT Pub. Date: Jan. 19, 2023

(65) Prior Publication Data
US 2024/0282056 A1 Aug. 22, 2024

Related U.S. Application Data

(60) Provisional application No. 63/221,467, filed on Jul. 13, 2021.

(51) Int. Cl.
*G06T 17/05* (2011.01)
*B60K 35/23* (2024.01)
(Continued)

(52) U.S. Cl.
CPC .............. *G06T 17/05* (2013.01); *B60K 35/23* (2024.01); *B60K 35/28* (2024.01); *G01C 21/30* (2013.01);
(Continued)

(58) Field of Classification Search
None
See application file for complete search history.

(56) References Cited

U.S. PATENT DOCUMENTS 5,802,492 A * 9/1998 DeLorme ............. G09B 29/106
340/995.23
7,860,301 B2 12/2010 Se et al.
(Continued)

FOREIGN PATENT DOCUMENTS

KR 20040025150 3/2004
KR 1020170005602 1/2017
(Continued)

OTHER PUBLICATIONS

PCT International Application No. PCT/KR2022/010102, International Search Report dated Oct. 26, 2022, 2 pages.
(Continued)

*Primary Examiner* — Jason A Pringle-Parker
(74) *Attorney, Agent, or Firm* — LEE, HONG, DEGERMAN, KANG & WAIMEY

(57) ABSTRACT

A mixed reality automotive meta service (MR AMS) server of the present invention is provided outside a vehicle, and provides an MR AMS. The MR AMS server comprises: an API which is an interface that calls a function for communicating with an MR AMS client provided in the vehicle; a service aggregation manager that requests and receives, from a service provider, context corresponding to a request received from the MR AMS client; and a data integrated
(Continued)

manager that loads, from a database, a three-dimensional asset corresponding to the received context.

14 Claims, 22 Drawing Sheets

(51) Int. Cl.

| | |
|---|---|
| *B60K 35/28* | (2024.01) |
| *G01C 21/30* | (2006.01) |
| *G01C 21/36* | (2006.01) |
| *G06F 9/54* | (2006.01) |
| *G06T 7/73* | (2017.01) |
| *G06T 7/80* | (2017.01) |
| *G06T 15/04* | (2011.01) |
| *G06T 19/00* | (2011.01) |
| *G06V 20/56* | (2022.01) |

(52) U.S. Cl.
CPC ..... *G01C 21/3602* (2013.01); *G01C 21/3635* (2013.01); *G01C 21/3638* (2013.01); *G01C 21/3641* (2013.01); *G01C 21/3644* (2013.01); *G01C 21/3647* (2013.01); *G01C 21/365* (2013.01); *G01C 21/367* (2013.01); *G01C 21/3682* (2013.01); *G06F 9/543* (2013.01); *G06T 7/73* (2017.01); *G06T 7/80* (2017.01); *G06T 15/04* (2013.01); *G06T 19/00* (2013.01); *G06T 19/006* (2013.01); *G06V 20/56* (2022.01); *B60K 2360/166* (2024.01); *B60K 2360/177* (2024.01); *B60K 2360/21* (2024.01); *G06T 2200/24* (2013.01); *G06T 2207/10028* (2013.01); *G06T 2207/30252* (2013.01)

(56) References Cited

U.S. PATENT DOCUMENTS

| | | | |
|---|---|---|---|
| 8,564,607 | B2 | 10/2013 | Lee et al. |
| 9,195,390 | B2 | 11/2015 | Wu |
| 9,945,676 | B2* | 4/2018 | Wong .................... G06F 16/285 |
| 11,276,234 | B2 | 3/2022 | Choi et al. |
| 11,610,342 | B2 | 3/2023 | Wan et al. |
| 11,651,565 | B2 | 5/2023 | McCall |
| 12,229,874 | B1 | 2/2025 | Mousseau |
| 2007/0260628 | A1* | 11/2007 | Fuchs ..................... G06F 16/29 |
| 2009/0289937 | A1 | 11/2009 | Flake et al. |
| 2010/0235080 | A1 | 9/2010 | Faenger et al. |
| 2012/0254263 | A1* | 10/2012 | Hiestermann ...... G01C 21/3844 707/812 |
| 2014/0277939 | A1 | 9/2014 | Ren et al. |
| 2014/0301645 | A1 | 10/2014 | Mattila |
| 2017/0330034 | A1 | 11/2017 | Wang et al. |
| 2018/0066956 | A1 | 3/2018 | Kim et al. |
| 2018/0196427 | A1 | 7/2018 | Majumdar et al. |
| 2018/0227974 | A1 | 8/2018 | Puttagunta et al. |
| 2019/0017839 | A1 | 1/2019 | Eyler et al. |
| 2019/0043235 | A1 | 2/2019 | Tsushima et al. |
| 2019/0066382 | A1 | 2/2019 | Kubo et al. |
| 2019/0166352 | A1 | 5/2019 | Alaniz et al. |
| 2020/0004332 | A1 | 1/2020 | Jeon et al. |
| 2020/0042083 | A1 | 2/2020 | Min |
| 2020/0062179 | A1 | 2/2020 | Kim |
| 2020/0074061 | A1 | 3/2020 | Kim |
| 2020/0153885 | A1 | 5/2020 | Lee et al. |
| 2020/0273235 | A1 | 8/2020 | Emami et al. |
| 2020/0304375 | A1 | 9/2020 | Chennai et al. |
| 2020/0312005 | A1 | 10/2020 | Desai et al. |
| 2021/0036834 | A1 | 2/2021 | Lee et al. |
| 2021/0056762 | A1* | 2/2021 | Robbe ................ G06F 16/2282 |
| 2021/0117214 | A1 | 4/2021 | Presant et al. |
| 2021/0125411 | A1 | 4/2021 | Choi et al. |
| 2021/0134248 | A1 | 5/2021 | Wan et al. |
| 2021/0142526 | A1 | 5/2021 | Mantyjarvi et al. |
| 2021/0148713 | A1* | 5/2021 | Yu .......................... G01C 21/32 |
| 2021/0150236 | A1 | 5/2021 | Yu et al. |
| 2021/0158779 | A1 | 5/2021 | Singh |
| 2021/0190530 | A1 | 6/2021 | Jung et al. |
| 2021/0201584 | A1 | 7/2021 | Ha et al. |
| 2021/0207971 | A1 | 7/2021 | Kim et al. |
| 2022/0163337 | A1 | 5/2022 | Ju et al. |
| 2022/0254119 | A1 | 8/2022 | Berliner et al. |
| 2023/0058169 | A1 | 2/2023 | Cella et al. |
| 2023/0245391 | A1 | 8/2023 | Adkinson et al. |
| 2024/0096037 | A1 | 3/2024 | Warren et al. |
| 2024/0290143 | A1 | 8/2024 | Famiglietti et al. |
| 2025/0076079 | A1 | 3/2025 | Wannerberg |
| 2025/0076080 | A1 | 3/2025 | Phillips |
| 2025/0153735 | A1 | 5/2025 | Li et al. |
| 2025/0171051 | A1 | 5/2025 | Li et al. |

FOREIGN PATENT DOCUMENTS

| | | |
|---|---|---|
| KR | 1020200060651 | 6/2020 |
| KR | 1020210048739 | 5/2021 |
| KR | 10-2021-0080936 | 7/2021 |
| KR | 1020210087271 | 7/2021 |

OTHER PUBLICATIONS

U.S. Appl. No. 18/550,422, Notice of Allowance dated Apr. 3, 2024, 23 pages.

European Patent Office Application Serial No. 22842431.3, Search Report dated Aug. 13, 2024, 17 pages.

Matsumoto et al., "Dracena: Real-Time Digital Twin Platform: Fujitsu Global," XP093026753, https:..www.fujitsu.com/global/about/resources/publications/technicalreview/2020-02/article04.html, Feb. 2023, 18 pages.

Fernandez et al., "Associated Reality: A cognitive Human-Machine Layer for autonomous driving," Robotics and Autonomous Systems, Elsevier BV, vol. 133, Aug. 2020, 15 pages.

European Patent Office Application Serial No. 22842414.9, Search Report dated Oct. 14, 2024, 13 pages.

European Patent Office Application Serial No. 22842438.8, Search Report dated Mar. 21, 2025, 11 pages.

European Patent Office Application Serial No. 22842418.0, Search Report dated Mar. 10, 2025, 9 pages.

European Patent Office Application Serial No. 22842415.6, Search Report dated Apr. 7, 2025, 11 pages.

European Patent Office Application Serial No. 22842434.7, Search Report dated Oct. 25, 2024, 10 pages.

European Patent Office Application Serial No. 22842439.6, Search Report dated Nov. 18, 2024, 7 pages.

Korean Intellectual Property Office Application No. 10-2023-7022159, Office Action dated Jul. 28, 2025, 9 pages.

Wang et al., "A Digital Twin Paradigm: Vehicle-to-Cloud Based Advanced Driver Assistance Systems", Downloaded Jul. 25, 2025 from IEEE Xplore, 6 pages.

U.S. Appl. No. 18/567,889, Office Action dated Aug. 19, 2025, 34 pages.

U.S. Appl. No. 18/579,000, Office Action dated Jul. 29, 2025, 12 pages.

Aheleroff et al., "Digital Twin as a Service (DTaaS) in Industry 4.0: An Architecture Reference Model", Advanced Engineering Informatics, vol. 47, Jan. 2021, 32 pages.

Korean Intellectual Property Office Application No. 10-2023-7026072, Office Action dated May 27, 2025, 4 pages.

U.S. Appl. No. 18/579,180, Office Action dated Jun. 18, 2025, 9 pages.

U.S. Appl. No. 18/567,587, Notice of Allowance dated Jul. 11, 2025, 22 pages.

* cited by examiner

FIG. 9

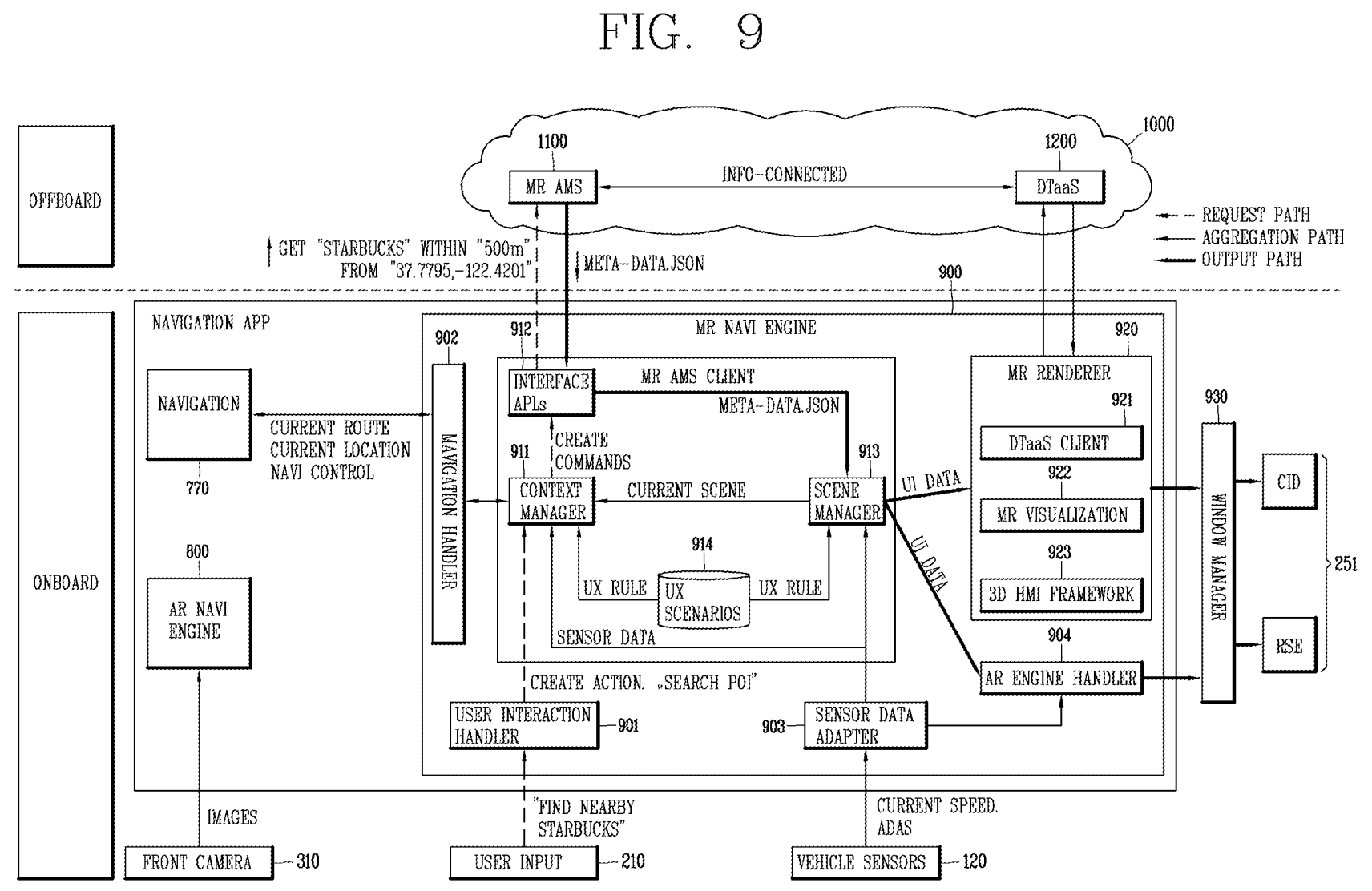

REQUEST PATH
AGGREGATION PATH
OUTPUT PATH

251

CID

RSE

930   WINDOW MANAGER

1000

1200   DTaaS

920   MR RENDERER

921   DTaaS CLIENT

922   MR VISUALIZATION 923   3D HMI FRAMEWORK

904   AR ENGINE HANDLER

900   MR NAVI ENGINE

UI DATA

UI DATA

913   SCENE MANAGER

META-DATA.JSON

MR AMS CLIENT

CURRENT SCENE

914   UX RULE   UX SCENARIOS

UX RULE

SENSOR DATA

903   SENSOR DATA ADAPTER

CURRENT SPEED. ADAS

120   VEHICLE SENSORS

INFO-CONNECTED

META-DATA.JSON

1100   MR AMS

GET "STARBUCKS" WITHIN "500m" FROM "37.7795,-122.4201"

912   INTERFACE APIs

CREATE COMMANDS

911   CONTEXT MANAGER

UX RULE

CREATE ACTION. "SEARCH POI"

901   USER INTERACTION HANDLER

"FIND NEARBY STARBUCKS"

210   USER INPUT

902   NAVIGATION HANDLER

CURRENT ROUTE
CURRENT LOCATION
NAVI CONTROL

NAVIGATION APP

770   NAVIGATION

800   AR NAVI ENGINE

IMAGES

310   FRONT CAMERA

OFFBOARD

ONBOARD

CONTEXT MANAGER

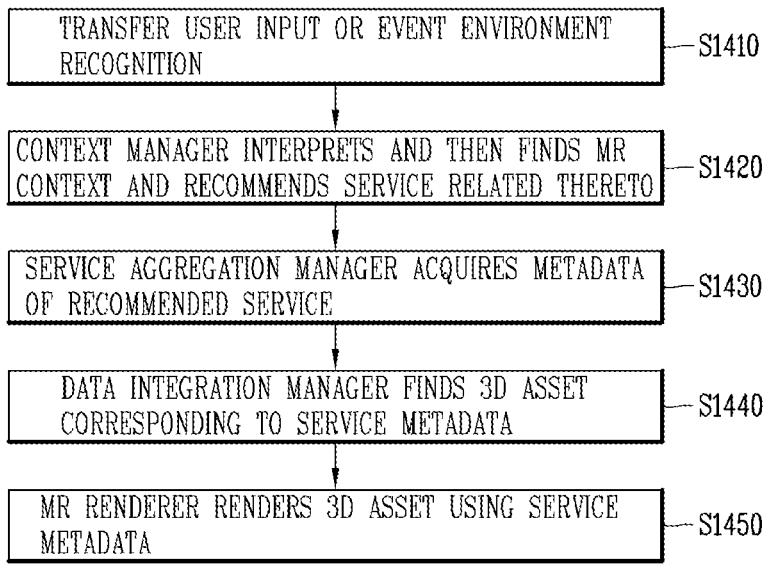

TRANSFER USER INPUT OR EVENT ENVIRONMENT RECOGNITION — S1410

CONTEXT MANAGER INTERPRETS AND THEN FINDS MR CONTEXT AND RECOMMENDS SERVICE RELATED THERETO — S1420

SERVICE AGGREGATION MANAGER ACQUIRES METADATA OF RECOMMENDED SERVICE — S1430

DATA INTEGRATION MANAGER FINDS 3D ASSET CORRESPONDING TO SERVICE METADATA — S1440

MR RENDERER RENDERS 3D ASSET USING SERVICE METADATA — S1450

FIG. 15

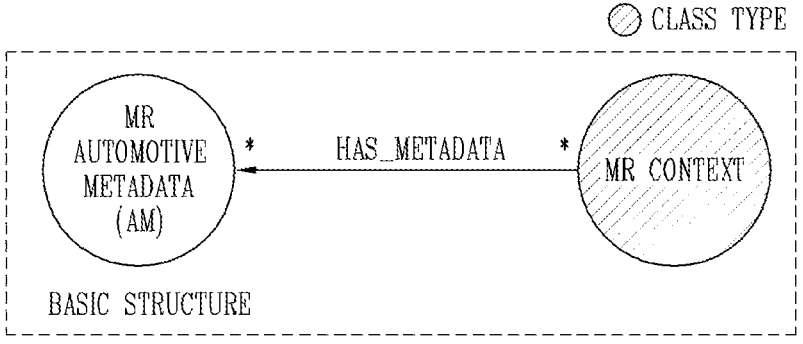

◯ CLASS TYPE

MR AUTOMOTIVE METADATA (AM)     *     HAS_METADATA     *     MR CONTEXT

BASIC STRUCTURE

FIG. 17

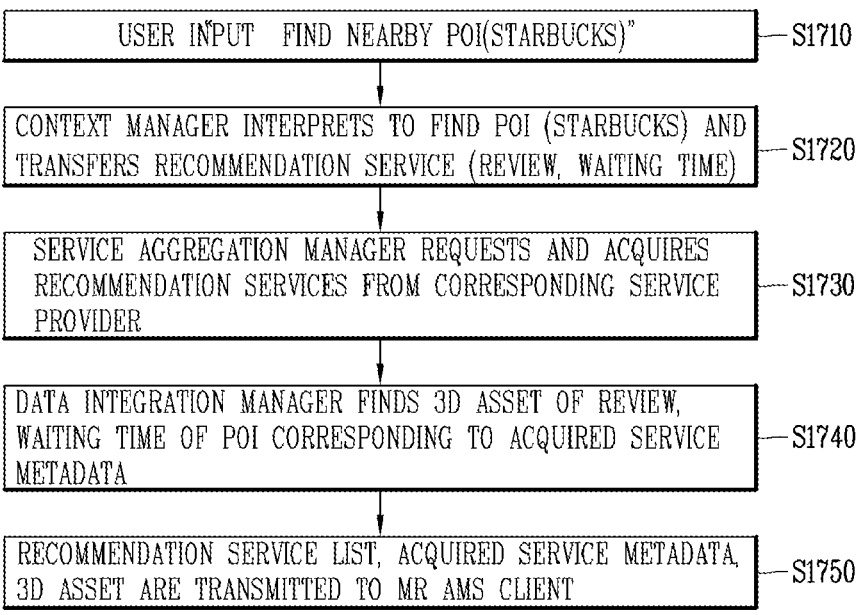

USER INPUT "FIND NEARBY POI(STARBUCKS)" —— S1710

CONTEXT MANAGER INTERPRETS TO FIND POI (STARBUCKS) AND TRANSFERS RECOMMENDATION SERVICE (REVIEW, WAITING TIME) —— S1720

SERVICE AGGREGATION MANAGER REQUESTS AND ACQUIRES RECOMMENDATION SERVICES FROM CORRESPONDING SERVICE PROVIDER —— S1730

DATA INTEGRATION MANAGER FINDS 3D ASSET OF REVIEW, WAITING TIME OF POI CORRESPONDING TO ACQUIRED SERVICE METADATA —— S1740

RECOMMENDATION SERVICE LIST, ACQUIRED SERVICE METADATA, 3D ASSET ARE TRANSMITTED TO MR AMS CLIENT —— S1750

FIG. 18

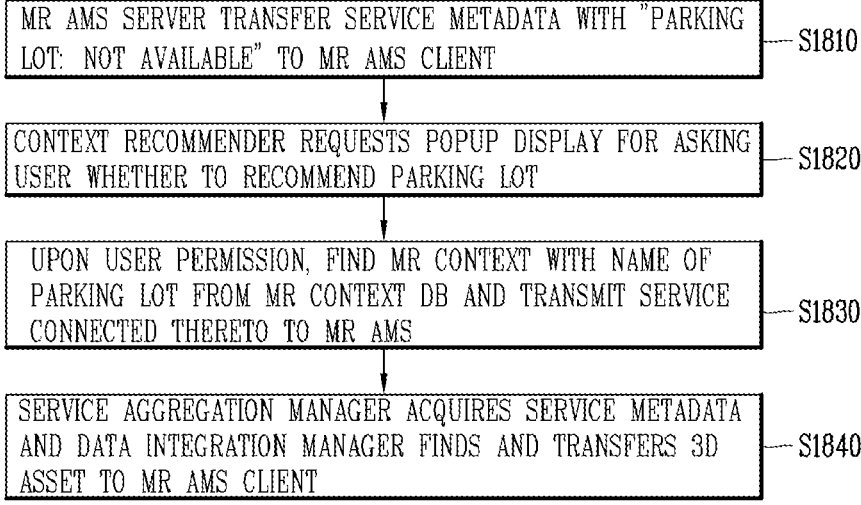

MR AMS SERVER TRANSFER SERVICE METADATA WITH "PARKING LOT: NOT AVAILABLE" TO MR AMS CLIENT —— S1810

CONTEXT RECOMMENDER REQUESTS POPUP DISPLAY FOR ASKING USER WHETHER TO RECOMMEND PARKING LOT —— S1820

UPON USER PERMISSION, FIND MR CONTEXT WITH NAME OF PARKING LOT FROM MR CONTEXT DB AND TRANSMIT SERVICE CONNECTED THERETO TO MR AMS —— S1830

SERVICE AGGREGATION MANAGER ACQUIRES SERVICE METADATA AND DATA INTEGRATION MANAGER FINDS AND TRANSFERS 3D ASSET TO MR AMS CLIENT —— S1840

FIG. 19

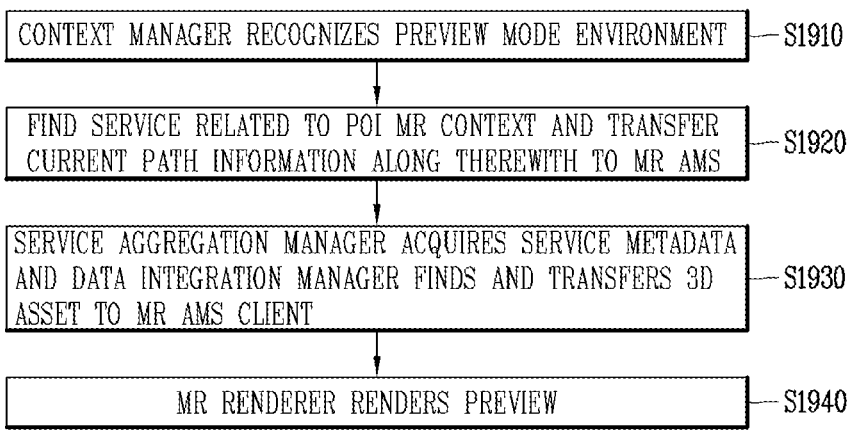

| | |
|---|---|
| CONTEXT MANAGER RECOGNIZES PREVIEW MODE ENVIRONMENT | S1910 |
| FIND SERVICE RELATED TO POI MR CONTEXT AND TRANSFER CURRENT PATH INFORMATION ALONG THEREWITH TO MR AMS | S1920 |
| SERVICE AGGREGATION MANAGER ACQUIRES SERVICE METADATA AND DATA INTEGRATION MANAGER FINDS AND TRANSFERS 3D ASSET TO MR AMS CLIENT | S1930 |
| MR RENDERER RENDERS PREVIEW | S1940 |

FIG. 20

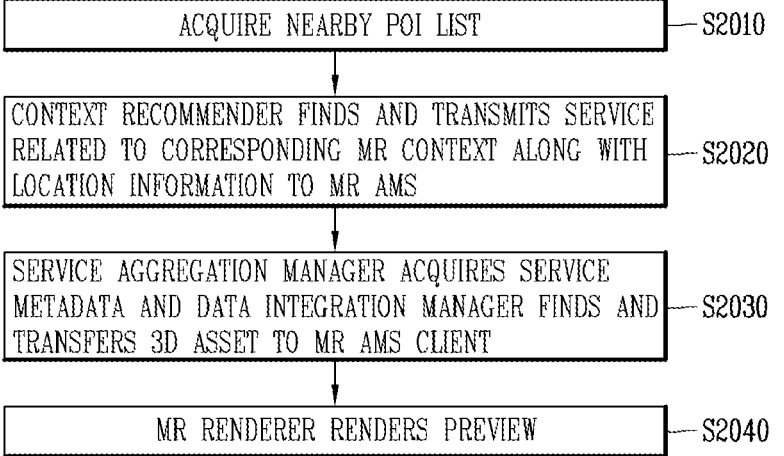

| | |
|---|---|
| ACQUIRE NEARBY POI LIST | S2010 |
| CONTEXT RECOMMENDER FINDS AND TRANSMITS SERVICE RELATED TO CORRESPONDING MR CONTEXT ALONG WITH LOCATION INFORMATION TO MR AMS | S2020 |
| SERVICE AGGREGATION MANAGER ACQUIRES SERVICE METADATA AND DATA INTEGRATION MANAGER FINDS AND TRANSFERS 3D ASSET TO MR AMS CLIENT | S2030 |
| MR RENDERER RENDERS PREVIEW | S2040 |

| DRIVING SCENARIO | REFERENCE |
|---|---|
| POI VISIBLE IN THE PATH | |
| POI IS WITHIN THE DISTANCE | |
| POI IS ALMOST NEXT TO THE EGO CAR | |
| POI IS OUT OF FORWARD SIGHT | |

FIG. 23
MR MODE (ENHANCING VISIBILITY)
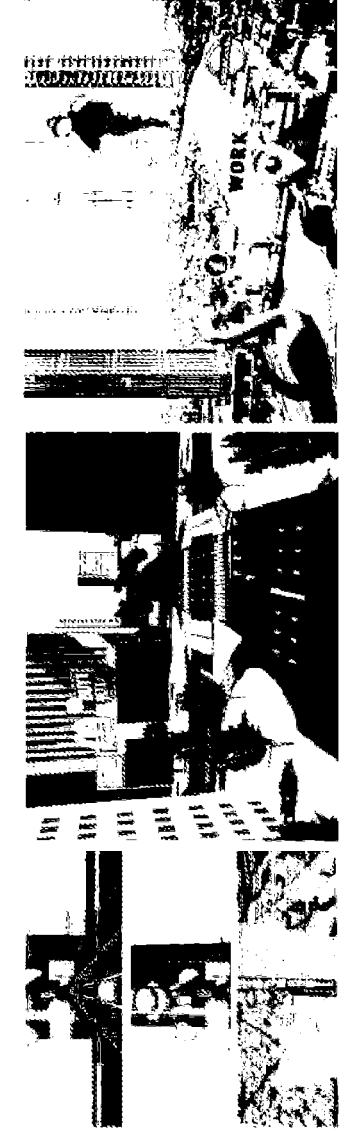
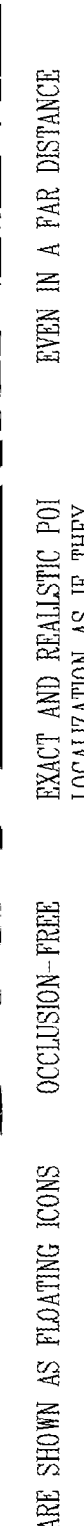
AR MODE (VISIBLE CAMERA VIEW)
EVEN IN A FAR DISTANCE
EXACT AND REALISTIC POI LOCALIZATION AS IF THEY WERE ACTUALLY THERE
OCCLUSION-FREE
POIS ARE SHOWN AS FLOATING ICONS

MR SERVICE PLATFORM FOR PROVIDING MIXED REALITY AUTOMOTIVE META SERVICE AND CONTROL METHOD THEREOF

CROSS-REFERENCE TO RELATED APPLICATION(S)

This application is the National Stage filing under 35 U.S.C. 371 of International Application No. PCT/KR2022/010102, filed on Jul. 12, 2022, which claims the benefit of earlier filing date and right of priority to U.S. Provisional Application No. 63/221,467 filed Jul. 13, 2021, the contents of which are all incorporated by reference herein in their entirety.

TECHNICAL FIELD

The present disclosure relates to an MR service platform that provides a mixed reality automotive meta service and a method of controlling the same.

BACKGROUND ART

A vehicle is an apparatus capable of being moved in a desired direction by a user who is on board. Typically, an automobile will be taken as an example.

Meanwhile, for convenience of a user using a vehicle, various types of sensors and electronic apparatuses are provided in the vehicle. In particular, for the convenience of the user's driving, research on an advanced driver assistance system (ADAS) is being actively carried out. Furthermore, development of an autonomous vehicle is being actively carried out.

In recent years, development on UI/UX and services that help the driving of a vehicle using augmented reality (hereinafter, AR), virtual reality (hereinafter, VR), and mixed reality (MR) technologies that mix AR and VR are being actively carried out.

In the case of using mixed reality technologies, there is an advantage capable of providing various information required for the driving of the vehicle based on an actual real world, or providing various interfaces related to the driving of the vehicle in a virtual world (or digital twin) that is almost similar to the real world, and further providing information, content, and the like in various fields as well as driving to vehicle occupants.

DISCLOSURE OF INVENTION

Technical Problem

An aspect of the present disclosure is to provide an MR service platform that provides an optimized mixed reality service related to a vehicle.

Another aspect of the present disclosure is to provide an MR service platform capable of providing a mixed reality automotive meta service that can help the driving of a vehicle.

Still another aspect of the present disclosure is to provide an MR service platform capable of providing information related to the driving of the vehicle in an optimized method through an interface implemented in mixed reality.

Yet still another aspect of the present disclosure is to provide an MR service platform capable of providing a mixed reality automotive meta service optimized according to an environment of a vehicle.

The problems of the present disclosure may not be limited to the above-mentioned problems, and other problems not mentioned herein may be clearly understood by those skilled in the art from the following description.

Solution to Problem

In order to achieve the objectives, an MR AMS server according to an embodiment of the present disclosure, which is an MR AMS server provided outside a vehicle to provide a mixed reality automotive meta service (MR AMS), may include an interface API that calls a function for communicating with an MR AMS client provided in the vehicle, a service aggregation manager that requests and receives a context corresponding to a request received from the MR AMS client from a service provider, and a data integration manager that loads a three-dimensional asset corresponding to the received context from a database.

In an embodiment, the interface API may transfer a user request received from the MR AMS client to the service aggregation manager.

In an embodiment, the interface API may include a first interface API that calls a function for performing communication with the MR AMS client, and a second interface API that calls a function for allowing the service aggregation manager to perform communication with the service provider.

In an embodiment, the service aggregation manager may request the requested context from different service providers based on a type of the context requested by the MR AMS client provided in the vehicle.

In an embodiment, the service aggregation manager may request a first type of context from a first service provider that provides the first type of context when the type of the requested context is the first type of context, and request a second type of context from a second service provider that provides the second type of context when the type of the requested context is the second type of context.

In an embodiment, the interface API may transmit a three-dimensional asset loaded from the data integration manager to the MR AMS client.

In an embodiment, the MR AMS server may further include a context manager that manages a context corresponding to the request received from the MR AMS client.

In an embodiment, the context manager may include a context handler that handles and parses a context request, a context interpreter that manages a session for interpreting a context request, and generates a context set using a data model, and a context graph database that stores the data model.

In an embodiment, the context handler may receive a user request input to the MR AMS client through the interface API, and parse the received user request to transmit the parsed user request to the context interpreter.

In an embodiment, the context interpreter may generate a session and then generate a query for a context request corresponding to the user request, and request and receive a context data model corresponding to the query from the context graph database.

In an embodiment, the context interpreter may request a context corresponding to the context data model from the service aggregation manager, and the service aggregation manager may request and receive context data corresponding to the context data model from the service provider.

In an embodiment, the service aggregation manager may request and receive a three-dimensional asset corresponding to the requested context from the data integration manager, and transmit the context data received from the service provider and the three-dimensional asset received from the data integration manager to the context interpreter.

In an embodiment, the context interpreter may transmit the received context data and the 3D asset to the MR AMS client provided in the vehicle through the context handler and the interface API.

In an embodiment, the context manager may further include a context recommender that extracts a recommendation context based on the generated context set and a context controller that manages a context to be acquired periodically.

In an embodiment, when the completed context data includes information that is unavailable for a specific service, the context recommender may request the context interpreter to generate a query for recommending a service capable of substituting the specific service.

An MR AMS client according to an embodiment of the present disclosure, which is an MR AMS client that is provided in a vehicle to provide a mixed reality automotive meta service (MR AMS), may include a context manager that requests a context corresponding to a user request from an MR AMS server provided outside the vehicle, a scene manager that manages MR scene information provided to a display provided in the vehicle, and a UX scenario database that provides a UX rule to at least one of the context manager and the scene manager.

In an embodiment, the MR AMS client may further include an interface API that calls a function for communicating with the MR AMS server provided outside the vehicle.

In an embodiment, the interface API may transmit a context request output from the context manager to the MR AMS server, and receive a three-dimensional asset corresponding to the requested context from the MR AMS server.

In an embodiment, the MR AMS client may be included in an MR service apparatus, and the MR service apparatus may include a user interaction handler that generates and transfers an action corresponding to a user input to the context manager when the user input is received through an input unit provided in the vehicle.

In an embodiment, the context manager may generate a command for requesting a context corresponding to an action received from the user interaction handler, and transmit the command to the MR AMS server through an interface API.

In an embodiment, the context manager may receive current scene information currently being output from a vehicle from the scene manager, receive a UX rule from the UX scenario database, receive navigation information including a current path and a current location from a navigation handler that handles the information of a navigation system, and generate a command for requesting the context based on at least one of the current scene information, the UX rule, and the navigation information.

In an embodiment, the interface API may receive the metadata of a context corresponding to the command and a three-dimensional asset corresponding to the context from the MR AMS server, and transmit the received metadata and three-dimensional asset to the scene manager.

In an embodiment, the scene manager may generate UI data using the UX rule received from the UX scenario database, and the metadata and the three-dimensional asset received from the interface API.

In an embodiment, the scene manager may transmit the generated UI data to an MR renderer that renders the generated UI data to be displayed as mixed reality (MR) on a display provided in the vehicle.

In an embodiment, the scene manager may further transmit the generated UI data to an AR engine handler configured to handle an AR service apparatus provided in the vehicle.

In an embodiment, the context manager may include a context handler that handles and parses a context request corresponding to a user request, a context interpreter that manages a session for interpreting a context request, and generates a context set using a data model, and a context graph database that stores the data model.

In an embodiment, the context manager may further include a context recommender that extracts a recommendation context based on the generated context set and a context controller that manages a context to be acquired periodically.

A DTaaS server according to an embodiment of the present disclosure, which is a Digital Twin as a Service (DTaaS) server provided outside a vehicle to provide a mixed reality automotive meta service (MR AMS), may include a DTaaS API that calls a function for communicating with an MR service apparatus provided in the vehicle, a database that stores a digital twin map and a renderable three-dimensional polygon map provided to the MR service apparatus, and a processor that transmits a three-dimensional polygon map corresponding to the location information to the MR service apparatus through the DTaaS API based on the location information of the vehicle received from the MR service apparatus.

In an embodiment, the DTaaS server may further include a telecommunication unit provided outside the vehicle to communicate with an MR AMS server that provides an MR AMS service.

In an embodiment, the DTaaS server may further include a digital twin map generation unit that generates a digital twin map by matching an actually photographed image with a three-dimensional polygon map stored in the database.

In an embodiment, the DTaaS server may further include a dynamic model database that stores dynamic information on a moving object received from at least one of an MR service apparatus and an MR AMS server, and a scenario database that stores information related to a scenario that can be implemented in a digital twin.

In an embodiment, the DTaaS may further include a simulation unit that performs a simulation corresponding to a user request on the digital twin and a visualization unit that visualizes information to be implemented on the digital twin.

An MR renderer according to an embodiment of the present disclosure, which is an mixed reality (MR) renderer provided in a vehicle to provides a mixed reality automotive meta service (MR AMS), may include a DTaaS API that calls a function for communicating with a Digital Twin as a Service (DTaaS) server that provides at least one of a digital twin map and a three-dimensional polygon map, an MR visualization unit that receives UI data from an MR AMS client, and visualizes a mixed reality image using a three-dimensional polygon map received from the DTaaS API and the UI data, and a three-dimensional HMI framework that generates a three-dimensional human-machine interface (HMI) to allow a user-operable interface to be included in the mixed reality image.

In an embodiment, the three-dimensional HMI framework may overlap the interface with the mixed reality image generated by the MR visualization unit, and transmit the mixed reality image overlapped with the interface to be displayed on a display provided in the vehicle to a window manager provided in the vehicle.

In an embodiment, the UI data may include information related to a camera image captured by a camera of the vehicle and an object related to an MR service, and the MR visualization unit may generate a digital twin map by matching an image extracted from the camera image included in the UI data on the three-dimensional polygon map, and generate the mixed reality image by overlapping the object related to the MR service on the digital twin map.

In an embodiment, the MR visualization unit may periodically receive the UI data from the MR AMS client, and update an object related to an MR service using the received UI data.

In an embodiment, the window manager may output at least one of a mixed reality image transmitted from the MR renderer and a camera image in which AR information transmitted from an augmented reality (AR) service apparatus overlaps to a display provided in the vehicle. Other details of embodiments are included in the detailed description and the drawings.

Advantageous Effects of Invention

According to an embodiment of the present disclosure, there are one or more following effects.

First, according to the present disclosure, it may be possible to provide an MR service platform capable of providing an optimized MR service or a mixed reality automotive meta service to a passenger who is onboard a vehicle.

Second, according to the present disclosure, it may be possible to provide an MR service platform capable of providing information corresponding to a user request in the form of MR using an optimized method.

Third, according to the present disclosure, it may be possible to provide an MR service platform capable of providing an MR interface optimized in consideration of a current state of the vehicle to a user.

The effects of the present disclosure may not be limited to the above-mentioned effects, and other effects not mentioned herein may be clearly understood by those skilled in the art from the description of the claims.

BRIEF DESCRIPTION OF DRAWINGS

FIG. 9 is a conceptual diagram for explaining an MR AMS client of the present disclosure.

FIG. 13 is a conceptual diagram for explaining an MR renderer of the present disclosure.

FIGS. 14, 15, 16, 17, 18, 19 and 20 are flowcharts and conceptual diagrams for explaining a method for providing an MR automotive meta service according to an embodiment of the present disclosure.

FIGS. 21, 22 and 23 are conceptual diagrams for explaining an MR service providing screen according to an embodiment of the present disclosure.

MODE FOR THE INVENTION

Figure 1:
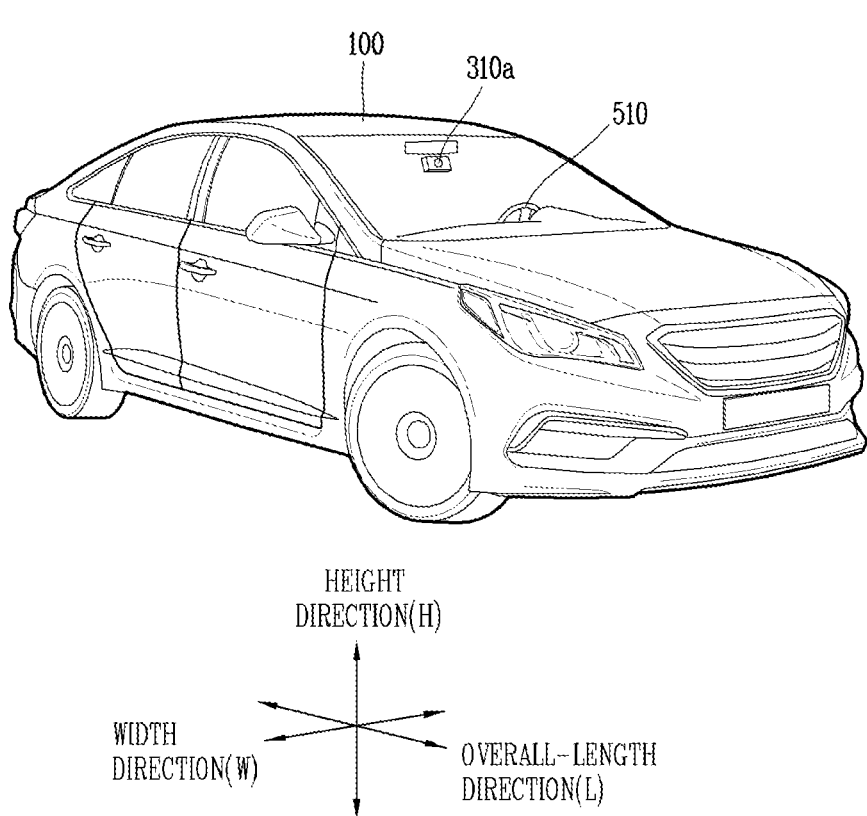
FIG. 1 is a view illustrating an appearance of a vehicle according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for elements disclosed in the following description is merely intended for easy description of the specification, and the suffix itself is not intended to give any special meaning or function. In describing the embodiments disclosed herein, moreover, the detailed description will be omitted when specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms "include" or "has" used herein should be understood that they are intended to indicate the existence of a feature, a number, a step, an element, a component or a combination thereof disclosed in the specification, and it may also be understood that the existence or additional possibility of one or more other features, numbers, steps, elements, components or combinations thereof are not excluded in advance.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating an appearance of a vehicle according to an embodiment of the present disclosure.

Figure 2:
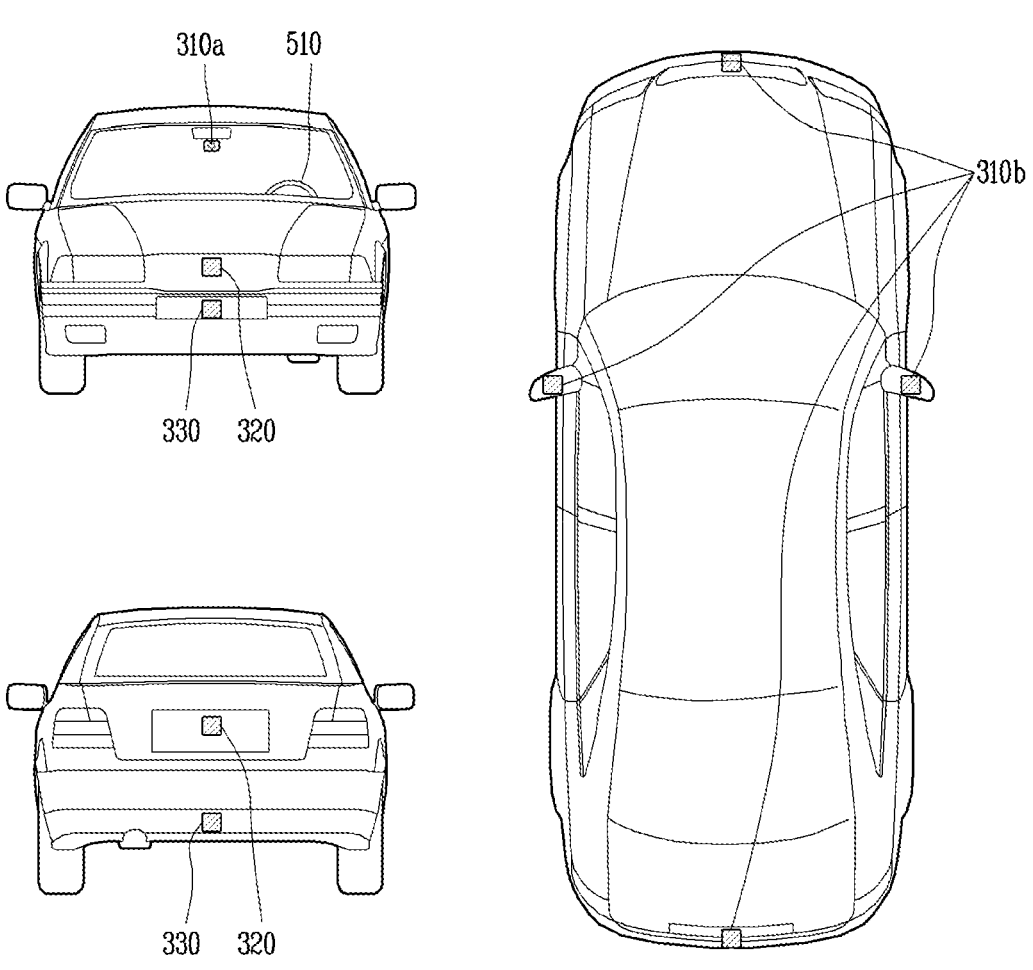
FIG. 2 is a view in which a vehicle according to an embodiment of the present disclosure is viewed at various angles from the outside.

FIG. 2 is a view in which a vehicle according to an embodiment of the present disclosure is viewed at various angles from the outside.

Figure 3:
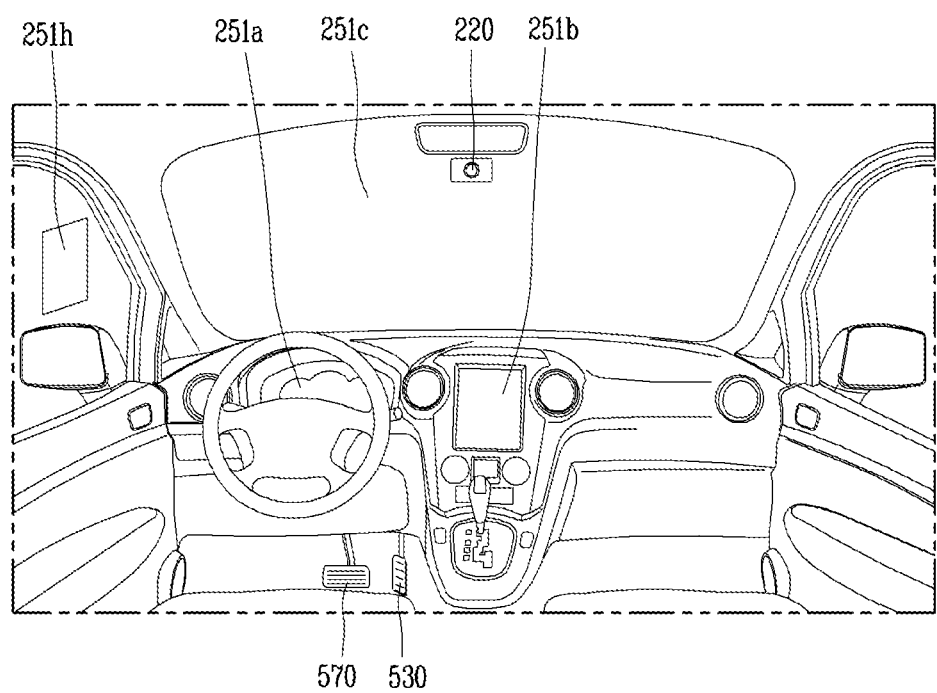
FIGS. 3 and 4 are views illustrating an inside of a vehicle according to an embodiment of the present disclosure.
Figure 4:
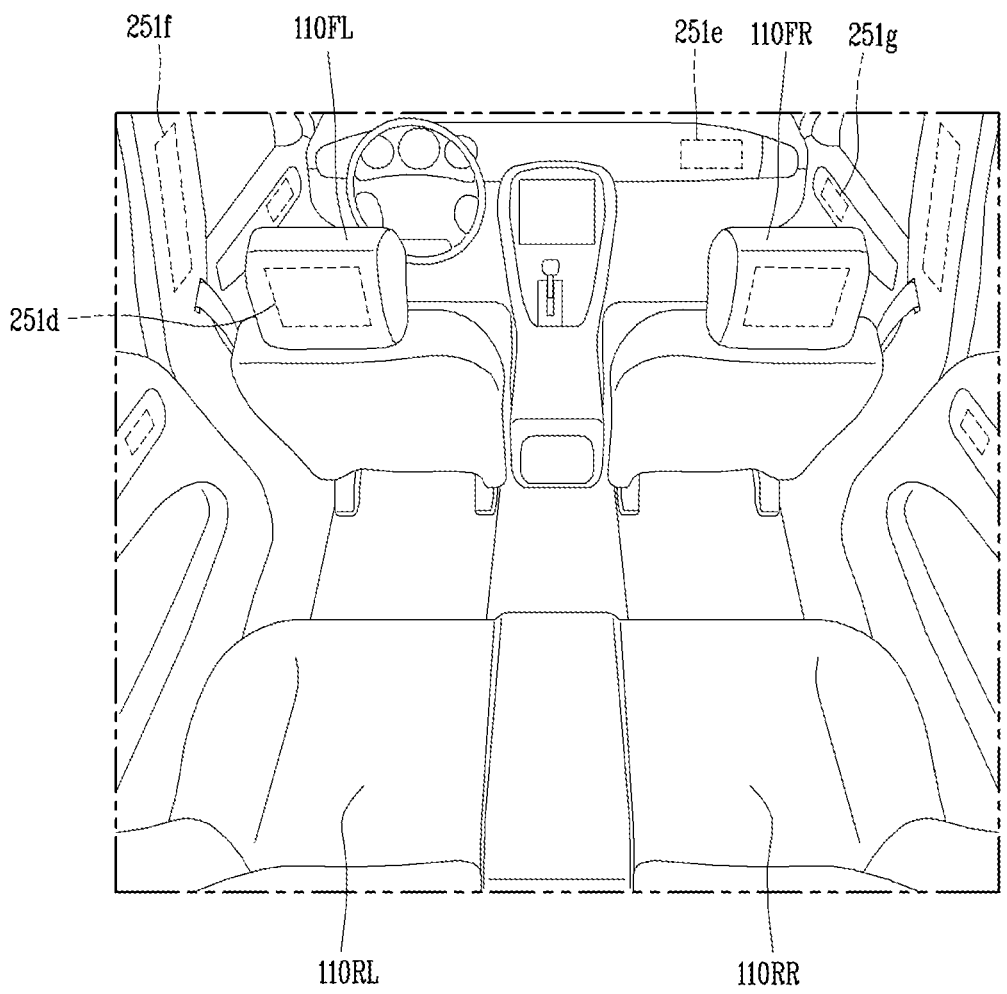

FIGS. 3 and 4 are views illustrating an inside of a vehicle according to an embodiment of the present disclosure.

Figure 5:
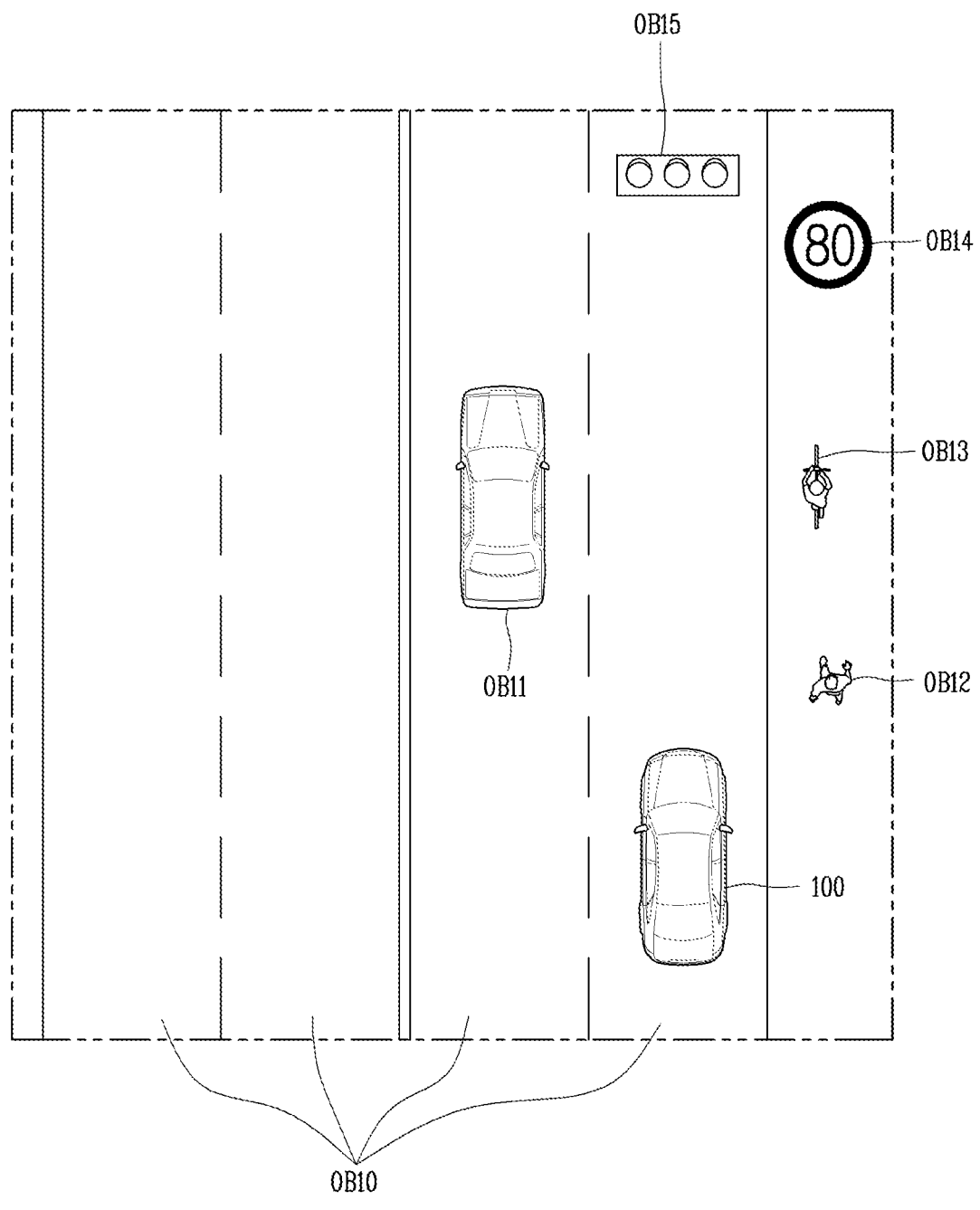
FIGS. 5 and 6 are views referenced to describe objects according to an embodiment of the present disclosure.
Figure 6:
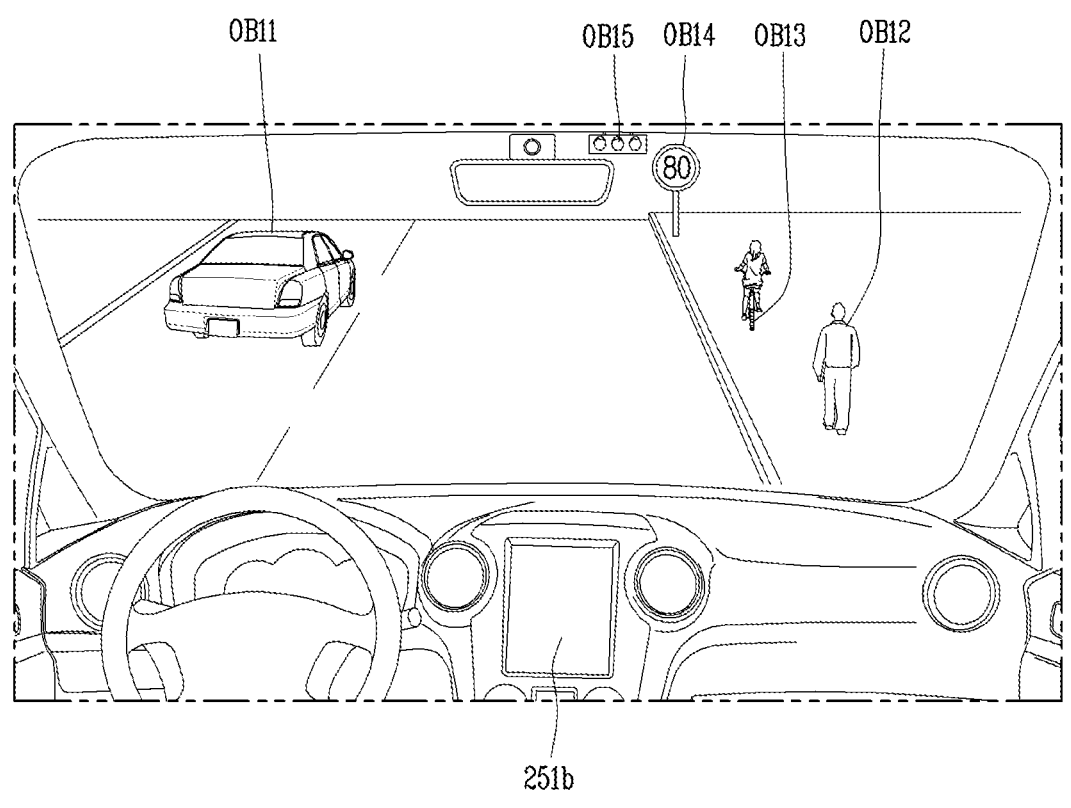

FIGS. 5 and 6 are views referenced to describe objects according to an embodiment of the present disclosure.

Figure 7:
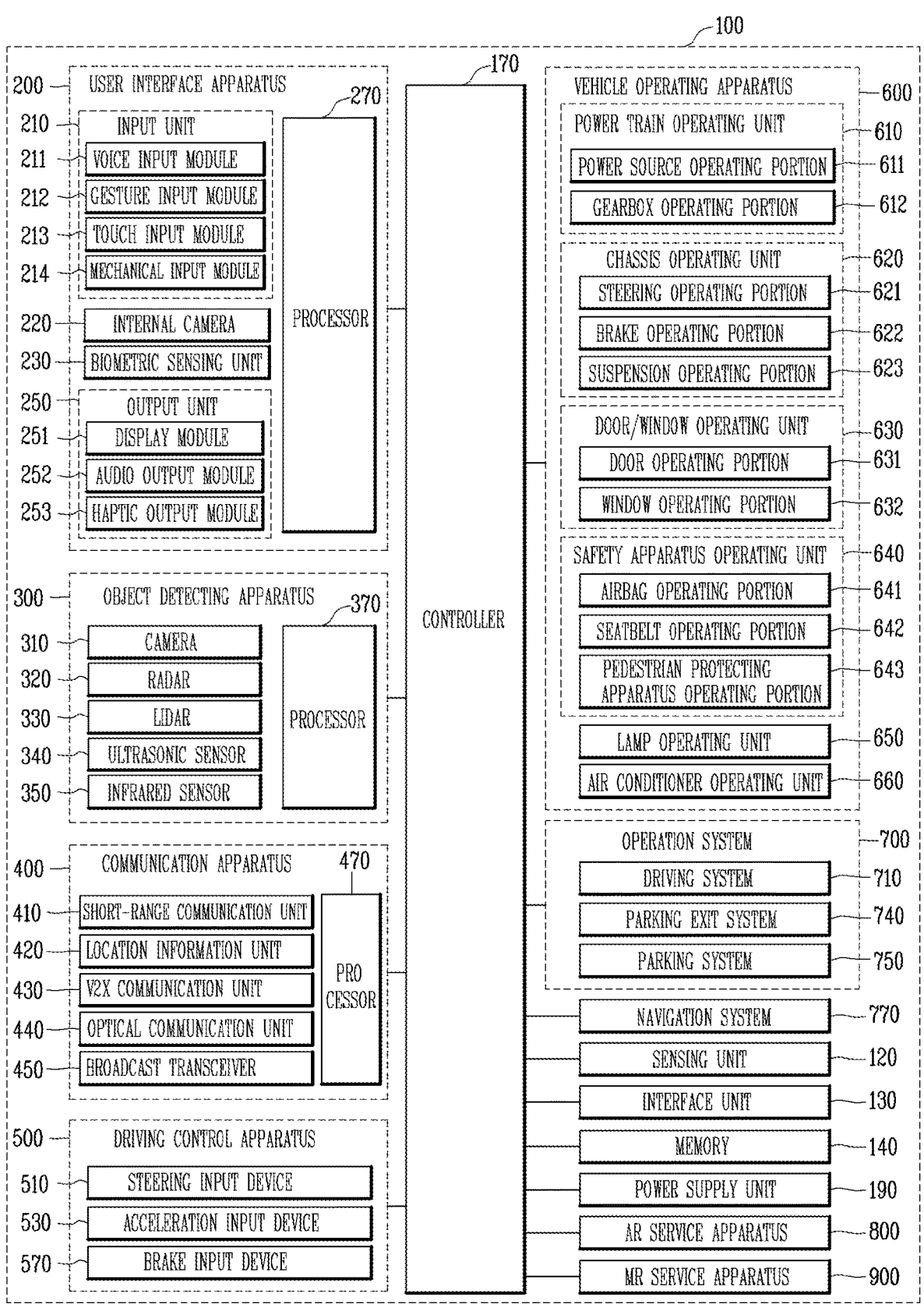
FIG. 7 is a block diagram referenced to describe a vehicle according to an embodiment of the present disclosure.

FIG. 7 is a block diagram referenced to describe a vehicle according to an embodiment of the present disclosure.

Referring to FIGS. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional gesture input. To this end, the gesture input module 212 may include a light emitting diode outputting a plurality of infrared rays or a plurality of image sensors.

The gesture input module 212 may detect the user's three-dimensional gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, auditory or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

Meanwhile, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be referred to as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The other vehicle OB11 may be a vehicle which is moving around the vehicle 100. The other vehicle OB11 may be a vehicle located within a predetermined distance from the vehicle 100. For example, the other vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a lidar 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360-degree camera.

For example, the camera 310 may be disposed adjacent to a front windshield within the vehicle to acquire a front image of the vehicle. Alternatively, the camera 310 may be disposed adjacent to a front bumper or a radiator grill.

For example, the camera 310 may be disposed adjacent to a rear glass within the vehicle to acquire a rear image of the vehicle. Alternatively, the camera 310 may be disposed adjacent to a rear bumper, a trunk or a tail gate.

For example, the camera 310 may be disposed adjacent to at least one of side windows within the vehicle to acquire a side image of the vehicle. Alternatively, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a location of the detected object, a distance from the detected object and a relative speed with the detected object.

The radar 320 may be disposed on an appropriate location outside the vehicle for detecting an object which is located at a front, rear or side of the vehicle.

The lidar 330 may include laser transmitting and receiving portions. The lidar 330 may be implemented in a time of flight (TOF) manner or a phase-shift manner.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The lidar 330 may detect an object in a time of flight (TOF) manner or a phase-shift manner through the medium of laser light, and detect a location of the detected object, a distance from the detected object and a relative speed with the detected object.

The lidar 330 may be disposed on an appropriate location outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a location of the detected object, a distance from the detected object and a relative speed with the detected object.

The ultrasonic sensor 340 may be disposed on an appropriate location outside the vehicle for detecting an object located at the front, rear or side of the vehicle.

The infrared sensor 350 may include infrared light transmitting and receiving portions. The infrared sensor 340 may detect an object based on infrared light, and detect a location of the detected object, a distance from the detected object and a relative speed with the detected object.

The infrared sensor 350 may be disposed on an appropriate location outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and a radio frequency (RF) circuit and a RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring location information. For example, the location information unit 420 may include a Global Positioning System (GPS) module or a Differential Global Positioning System (DGPS) module.

The V2X communication unit 430 is a unit for performing wireless communications with a server (vehicle to infrastructure; V2I), another vehicle (vehicle to vehicle; V2V), or a pedestrian (vehicle to pedestrian; V2P). The V2X communication unit 430 may include an RF circuit capable of implementing a communication protocol with an infrastructure (V2I), a communication protocol between vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another apparatus within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input apparatus 510, an acceleration input apparatus 530 and a brake input apparatus 570.

The steering input apparatus 510 may receive an input regarding a driving (ongoing) direction of the vehicle 100 from the user. The steering input apparatus 510 is preferably configured in the form of a wheel allowing a steering input in a rotating manner. According to some embodiments, the steering input apparatus may also be configured in a shape of a touch screen, a touchpad or a button.

The acceleration input apparatus 530 may receive an input for accelerating the vehicle 100 from the user. The brake input apparatus 570 may receive an input for braking the vehicle 100 from the user. Each of the acceleration input apparatus 530 and the brake input apparatus 570 is preferably configured in the form of a pedal. According to some embodiments, the acceleration input apparatus or the brake input apparatus may also be configured in the form of a touch screen, a touch pad or a button.

The driving control apparatus 500 may operate according to the control of the controller 170.

The vehicle operating apparatus 600 is an apparatus for electrically controlling operations of various apparatuses within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train apparatus.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis apparatus.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

Meanwhile, according to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a location (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each element according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include an AR service apparatus 800.

The AR service apparatus 800 may control at least one of those elements illustrated in FIG. 7. From this point of view, the AR service apparatus 800 may be the controller 170.

However, the present disclosure is not limited thereto, and the AR service apparatus 800 may be a separate configuration independent of the controller 170. When the AR service apparatus 800 is implemented as an element independent of the controller 170, the AR service apparatus 800 may be provided on a part of the vehicle 100.

Meanwhile, the AR service apparatus 800 described in the present specification may include all types of devices capable of controlling the vehicle, and may be a mobile terminal, as an example. When the AR service apparatus 800 is a mobile terminal, the mobile terminal and the vehicle 100 may be connected to each other to be communicable through wired/wireless communication. In addition, the mobile terminal may control the vehicle 100 in various ways in a communicatively connected state.

When the AR service apparatus 800 is a mobile terminal, the processor 870 described herein may be a controller of the mobile terminal.

Hereinafter, description will be given of an example that the AR service apparatus 800 is an element separate from the controller 170 for the sake of explanation. In this specification, functions (operations) and control methods described in relation to the AR service apparatus 800 may be executed by the controller 170 of the vehicle. In other words, all the details described in relation to the AR service apparatus 800 may be applied to the controller 170 in the same/similar manner.

Furthermore, the AR service apparatus 800 described herein may include some of the elements illustrated in FIG. 7 and various elements included in the vehicle. For the sake of explanation, the elements illustrated in FIG. 7 and the various elements included in the vehicle will be described with separate names and reference numbers.

Meanwhile, the vehicle 100 according to the present disclosure may include an MR service apparatus 900.

The MR service apparatus 900 may control at least one of those elements illustrated in FIG. 7. From this point of view, the MR service apparatus 900 may be the controller 170.

However, the present disclosure is not limited thereto, and the MR service apparatus 900 may be a separate configuration independent of the controller 170. When the MR service apparatus 900 is implemented as an element independent of the controller 170, the MR service apparatus 900 may be provided on a part of the vehicle 100.

Meanwhile, the MR service apparatus 900 described in the present specification may include all types of devices capable of controlling the vehicle, and may be a mobile terminal, as an example. When the MR service apparatus 900 is a mobile terminal, the mobile terminal and the vehicle 100 may be connected to each other to be communicable through wired/wireless communication. In addition, the mobile terminal may control the vehicle 100 in various ways in a communicatively connected state.

Hereinafter, description will be given of an example that the MR service apparatus 900 is an element separate from the controller 170 for the sake of explanation. In this specification, functions (operations) and control methods described in relation to the MR service apparatus 900 may be executed by the controller 170 of the vehicle. In other words, all the details described in relation to the AR service apparatus 800 may be applied to the controller 170 in the same/similar manner.

Furthermore, the MR service apparatus 900 described herein may include some of the elements illustrated in FIG. 7 and various elements included in the vehicle. For the sake of explanation, the elements illustrated in FIG. 7 and the various elements included in the vehicle will be described with separate names and reference numbers.

The AR service apparatus 800 and the MR service apparatus 900 described above may be provided in a vehicle, and may each be independent hardware.

As an example, the AR service apparatus 800 and the MR service apparatus 900 may be configured to be detachable from a part of the vehicle or elements provided in the vehicle.

Hereinafter, an MR service platform according to an embodiment of the present disclosure will be described in more detail with reference to the accompanying drawings.

Figure 8:
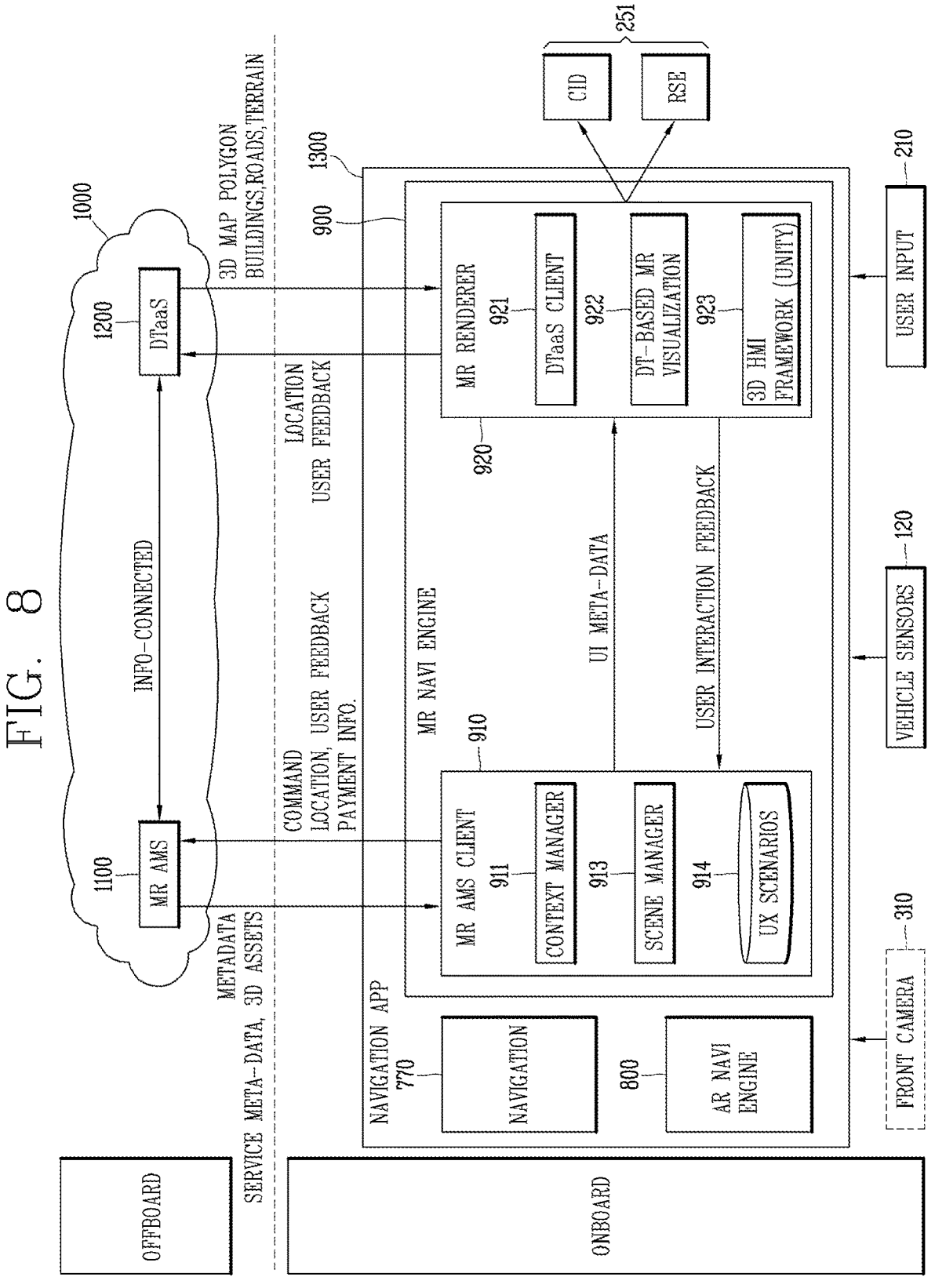
FIG. 8 is a conceptual diagram for explaining an MR service platform for providing an MR service of the present disclosure.

FIG. 8 is a conceptual diagram for explaining an MR service platform for providing an MR service of the present disclosure.

The present disclosure may provide an MR service platform capable of providing a mixed reality automotive meta service (MR AMS) (hereinafter, interchangeably used with an MR service).

The MR service platform may be referred to as an MR service system, an MR navigation system, an MR platform, an MR system, or the like.

The MR service platform refers to a platform capable of providing a service based on mixed reality, and may include several independent elements.

For example, the MR service platform may include an MR service apparatus 900 (or referred to as an MR navigation engine) provided at a vehicle end (onboard), an MR AMS (hereinafter, referred to as an MR AMS server) 1100 and a Digital Twin as a Service (DTaaS) server 1200 provided at a server end (or cloud end) outside the vehicle (offboard).

The MR service apparatus 900 may include an MR AMS client 910 and an MR renderer 920.

The MR service described herein may be understood as a mixed reality navigation service for a vehicle. That is, the MR service platform of the present disclosure may provide an interface for a vehicle implemented in mixed reality to a user who is onboard a vehicle.

The MR service provided by the MR service platform of the present disclosure may provide a digital world experience through a display in the vehicle while driving in an actual world.

Specifically, the MR service may interactively provide a driver with directions, safe driving, a point of interest (POI), and an entertainment user experience in a virtual 3D space in which real-world information is fused with the digital world.

Through this, the MR service platform of the present disclosure may provide a variety of user experiences (UXs) deviating from space-time constraints compared to camera-based (or head-up display (HUD)-based) augmented reality (AR) in the related art.

Here, the digital world may refer to a digital twin or a digital twinned smart city, and the real-world information may include infrastructure data such as Vehicle-to-Everything (V2X) and Cooperative-Intelligent Transport Systems (C-ITS) and/or surrounding recognition data sensed by a sensor provided in an autonomous driving vehicle.

Furthermore, the fusion described above may include a concept of fusing a vehicle and infrastructure sensor data, as well as an MR service cloud 1000 (or MR AMS cloud) and an MR service apparatus 900 for implementing the MR service platform.

In addition, "interactive" should be understood as a concept including not only mixed reality navigation, but also high-quality 3D image rendering and user interaction.

Meanwhile, mixed reality (MR) described herein may refer to an environment in which virtual reality is grafted onto a real world such that a real physical object and a virtual object can interact with each other.

Mixed reality (MR) may include the meaning of augmented reality (AR) in which virtual information is added based on reality and augmented virtuality (AV) in which reality information is added to a virtual environment.

In other words, a smart environment in which reality and virtuality are naturally connected to each other may be provided to provide the user with a rich experience. For example, the user may interact with a virtual pet placed on his or her palm or play a game by creating a virtual game environment in a real room. The user may also virtually rearrange furniture in his or her home, or create an environment where people in remote locations gather and work together.

The mixed reality auto meta service (MR AMS) using mixed reality (MR) according to an embodiment of the present disclosure may help the user to prepare road shapes and actions in advance by expressing a future driving path in preview.

Furthermore, the mixed reality automatic meta service (MR AMS) using mixed reality (MR) according to an embodiment of the present disclosure may improve an advertisement effect or induce service usage rate enhancement by allowing the user to watch a specific point of interest (POI).

In addition, the mixed reality automatic meta service (MR AMS) using mixed reality (MR) according to an embodiment of the present disclosure may not be dependent on a specific map company, and may allow data from various map companies to be fused with one another.

The present disclosure may provide an MR navigation function as one of the mixed reality automotive meta services.

Since the MR navigation function is implemented in a virtual world rather than overlapping an augmented reality object on a real world, it may be possible to solve problems such as front occlusion and difficulties in achieving matching quality that occur in AR navigation.

Accordingly, the present disclosure may improve a user experience (UX) by effectively expressing various contexts that have been difficult to express in the existing navigation through the MR navigation function.

To this end, the MR service platform of the present disclosure may provide an MR context management method, and a method and system of acquiring metadata and 3D assets for providing an MR AMS.

The MR service platform of the present disclosure may render related service metadata and 3D assets to MR navigation by defining an MR context required in a digital world and modeling the service metadata for acquiring the MR context.

Accordingly, the present disclosure may provide a digital world experience through a display in the vehicle while driving in an actual world, and recommend and provide various additional human machine interface (HMI) services to the user by utilizing the improved visibility and watchfulness of the MR navigation.

Hereinafter, an MR service platform according to an embodiment of the present disclosure for providing the foregoing MR service will be described.

Referring to FIG. 8, the MR service platform (or MR service system) of the present disclosure may include an MR service cloud 1000 provided outside a vehicle and an MR service apparatus 900 provided in the vehicle.

The MR service cloud 1100 provided outside the vehicle (offboard) may include at least one of a Mixed Reality Automotive Meta Service (MR AMS) server 1100 and a Digital Twin as a Service (DTaaS) server 1200.

The onboard MR service apparatus 900 may include an MR AMS client 910 and an MR renderer 920.

The MR service apparatus 900 may interact with the AR service apparatus 800 and the navigation system 770 to provide a navigation function (or a navigation application).

Information required for the navigation function may be received through the camera 310, the sensing unit 120, and a user input (or user request) received through the user input unit 210 provided in the vehicle.

Furthermore, the information required for the navigation function may be received through the MR service cloud 1000 provided outside the vehicle (offboard), and information sensed or processed in the vehicle may be transmitted to the MR service cloud 1000 to receive the information required for each vehicle.

Figure 10A:
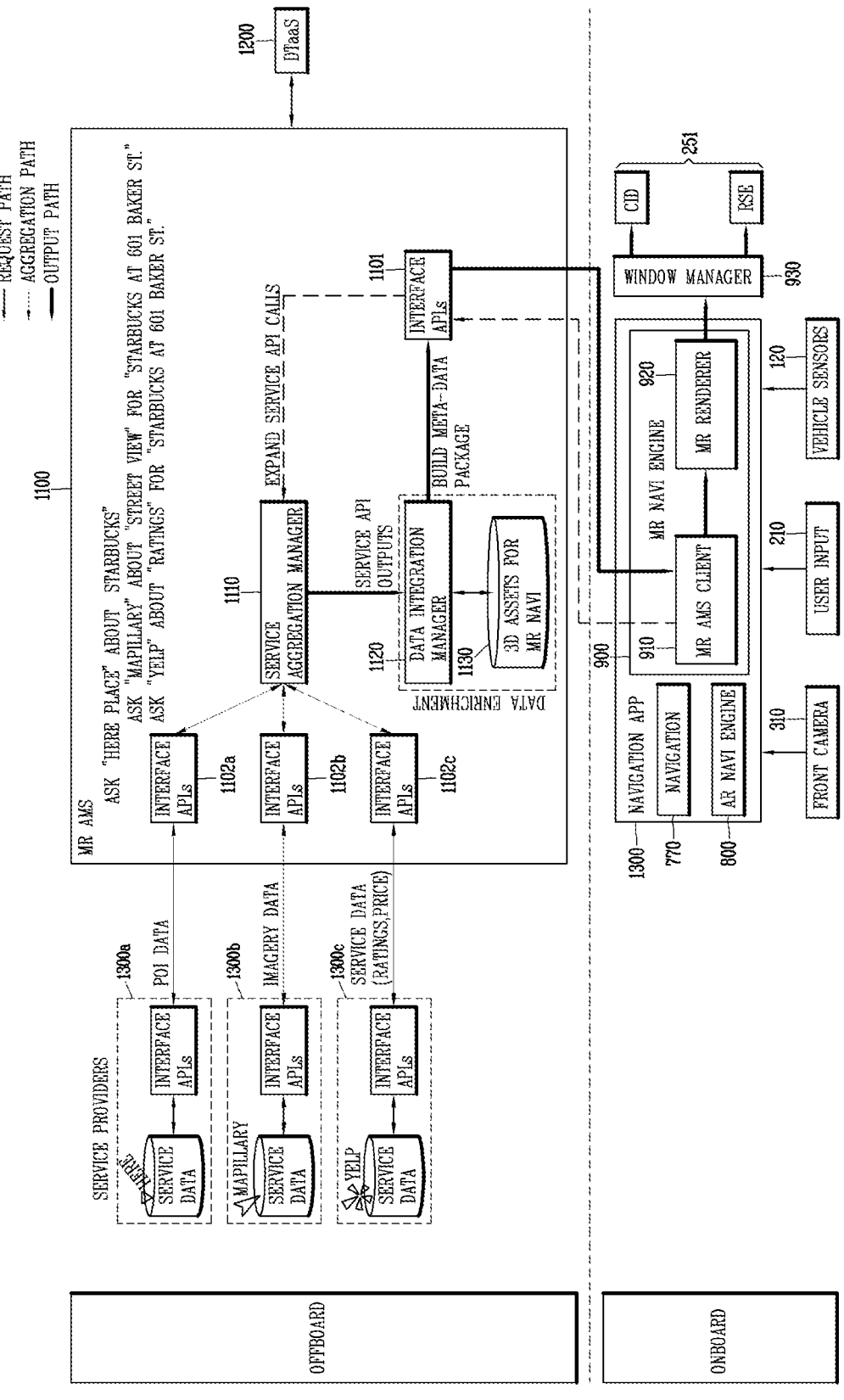
FIGS. 10A and 10B are conceptual diagrams for explaining an MR AMS server of the present disclosure.

As illustrated in FIG. 10A, the mixed reality automotive meta service (MR AMS) server 1100 may be connected to various service providers 1300a, 1300b, 1300c that provide online map services such as Open Street Map (OSM), Mapbox, HERE, WRLD, BingMAP, and the like. Furthermore, the mixed reality automotive meta service (MR AMS) server 1100 may aggregate shape information of each building included in a map (e.g., footprint information and height of the building) based on a result of aggregating map data provided from the connected service providers 1300a, 1300b, 1300c and provide the aggregated information to the DTaaS server 1200. Here, the DTaaS server 1200 may refer to a server or apparatus that provides a service using DTaaS, that is, a digital twin map.

The DTaaS may refer to a Digital Twin as a Service or a Digital Transformation as a Service.

Meanwhile, the DTaaS server 1200 may be connected to a POI database in which POI service data for each building or each region included in map information is stored. In addition, the DTaaS server 1200 may be connected to a 3D model database in which data of a three-dimensional polygon model (or three-dimensional polygon map) for each building included in the map information is stored. Here, the three-dimensional (3D) polygon model, which is a polygon model capable of providing a building volume, may be a polygon model in which a texture is not defined on a surface thereof. The DTaaS server 1200 may receive service data related to POI from the connected POI database, and may receive data of 3D polygon models of respective buildings included in the map information of a region from the connected 3D model database.

The processor (not shown) of the MR service apparatus 900 may receive various information related to the driving of the vehicle from the object detecting apparatus 300, the sensing unit 120, and the navigation system 770. For an example, the processor may receive information on an object detected from the front, rear, or side of the vehicle from the camera 310 of the object detecting apparatus 300.

In addition, the processor may receive information related to a speed of the vehicle, a driving direction thereof, a current location of the vehicle (GPS), and the like, from the sensing unit 120 including sensors connected to each component of the vehicle including the driving system 710. Furthermore, information related to the driving path of the vehicle may be provided from the navigation system 770.

Meanwhile, the MR service apparatus 900 and the DTaaS server 1200 may be connected through MR AMS interfaces (Interface APIs). Here, the MR service apparatus 900 and the MR AMS interfaces (Interface APIs) may be connected through a wireless network connection. In this case, the MR AMS server 1100 may be a network server or a cloud server connected to the MR service apparatus 900 in a wireless manner.

When connected to the MR AMS server 1100 as described above, the MR service apparatus 900 may provide at least part of information received from a component (e.g., the vehicle camera 310, the sensing unit 120, or a user input received from the user input unit 210) connected thereto to the MR AMS server 1100 through a network connection. Then, the MR AMS server 1100 may provide three-dimensional map data for providing mixed reality to the MR service apparatus 900 in response to the provided information.

For example, the MR service apparatus 900 may transmit information on objects detected around the vehicle, and information on a speed, a direction of the vehicle, and a current location of the vehicle. Furthermore, information on a driving path may be provided to the MR AMS server 1100. Then, the MR AMS server 1100 may provide the three-dimensional map data of a region according to the current location of the vehicle to the MR service apparatus 900 based on the information provided from the MR service apparatus 900.

In this case, the MR AMS server 1100 may determine POI information based on a current location of the vehicle, a speed of the vehicle, and a driving path of the vehicle, and provide three-dimensional map data further including the determined POI information in the three-dimensional building map. In addition, the MR AMS server 1100 may provide three-dimensional map data further including information on an environment around the vehicle to the MR service apparatus 900 based on the received information on objects around the vehicle.

Meanwhile, the MR service apparatus 900 may render a mixed reality image based on the three-dimensional map data received from the MR AMS server 1100. For an example, the MR service apparatus 900 may control the MR renderer 920 to display a three-dimensional map screen including models of buildings around the vehicle based on the received three-dimensional map data. Furthermore, the MR renderer 920 may display a graphic object corresponding to the vehicle on the three-dimensional map screen, and display graphic objects corresponding to the received POI data and environment information around the vehicle on the three-dimensional map screen.

Therefore, an image of a virtual environment (i.e., a mixed reality (MR) image, or MR navigation screen, or MR navigation interface) including a three-dimensional building model similar to a current vehicle and a shape of a building around the vehicle and a graphic object corresponding to the vehicle may be displayed on a display 251 provided in the vehicle, for example, a center information display (CID), a head up display (HUD), rear sheet information (RSI), or rear sheet entertainment (RSE).

In this case, information related to driving of the vehicle and an environment around the vehicle may be provided to a driver through the virtual environment. Through the three-dimensional map information, that is, a digital twin map (hereinafter referred to as a DT map), the MR service apparatus 900 according to an embodiment of the present disclosure may provide a mixed reality service to the driver.

Meanwhile, the MR AMS server 1100 may determine three-dimensional map data and three-dimensional map data, and POI information that can be provided along with the dimensional map data or environment information around each vehicle based on information collected from the MR service apparatus 900 provided in one vehicle as well as the MR service apparatuses 900 provided in a plurality of vehicles. In this case, the MR AMS server 1100 may collect information from a plurality of vehicles in the form of a cloud server, and generate three-dimensional map data for mixed reality based on the collected information. In addition, based on the generated three-dimensional map data, the mixed reality service may be provided to at least one MR service apparatus 900 provided in different vehicles.

Therefore, for convenience of description, hereinafter, a cloud or server, including the MR AMS server 1100 and the DTaaS server 1200, which provides metadata for providing a mixed reality service (e.g., service metadata, three-dimensional asset), and three-dimensional map information, that is, a digital twin map (DT map) such as a three-dimensional polygon map and a digital twin map, will be referred to as an MR service cloud 1000.

As illustrated in FIG. 8, the MR service apparatus 900 (or MR navigation engine) may include an MR AMS client 910 and an MR renderer 920.

In addition, in order to implement an MR navigation function, which is one of the MR services, the MR service apparatus 900 may transmit and receive data to and from the AR service apparatus 800 (or AR engine) and the navigation system 770 provided in the vehicle.

The MR AMS client 910 may include a context manager 911, a scene manager 913, and a UX scenario database 914.

Furthermore, the MR renderer 920 may include a DTaaS client 921, an MR visualization unit 922, and a three-dimensional HMI framework 923.

The MR AMS client 910 may collect location information of a vehicle, a user input, user feedback information, payment information, and the like, and transmit them to the MR AMS server 1100 existing outside the vehicle.

The MR AMS server 1100 may transmit at least one of metadata, service metadata, and three-dimensional assets required for providing an MR service based on information received from the MR AMS client.

The MR AMS client 910 may transmit data received from the MR AMS server 910 to the MR renderer 920.

The MR renderer 920 may generate a digital twin map using a three-dimensional polygon map received from the DTaaS server 1200 and an image received from the MR AMS client 910 or the camera 310 provided in the vehicle.

In addition, the MR renderer 920 may render data received from the MR AMS client 920 as an MR object that can be overlapped on the digital twin map, and overlap the rendered MR object on the digital twin map to generate a mixed reality (MR) image.

Then, the MR renderer 920 may display the generated mixed reality image on the display 251 provided in the vehicle.

All elements described herein may be implemented as separate hardware modules, and may be understood as elements implemented in units of blocks in a software configuration as necessary.

Hereinafter, each element constituting the MR service platform will be described in more detail with reference to the accompanying drawings.

FIG. 9 is a conceptual diagram for explaining an MR AMS client of the present disclosure.

The MR AMS client 910 may be provided in the vehicle to provide a mixed reality automotive meta service (MR AMS).

The MR AMS client 910 includes a context manager 911 that requests a context corresponding to a user request (or user input) from the MR AMS server 1100 provided outside the vehicle, a scene manager 913 that manages MR scene information provided to the display 251 provided in the vehicle, and a UX scenario database 914 that provides a UX rule to at least one of the context manager 911 and the scene manager 913.

Furthermore, the MR AMS client 910 may further include an interface API 912 that calls a function for communicating with the MR AMS server 1100 provided outside the vehicle.

The interface API 912, including one or more functions defined to communicate with the MR AMS server 1100, may convert a data format or a message format using these functions to transmit data to the MR AMS server 1100 or convert the format of data received from the MR AMS server 1100.

The interface API 921 may transmit a context request output from the context manager 911 to the MR AMS server 1100, and receive a three-dimensional (3D) asset corresponding to the requested context from the MR AMS server 912.

Here, the context may refer to environment information, and may refer to information corresponding to an environment around the vehicle. Furthermore, the context may include the concept of contents.

The three-dimensional asset may refer to three-dimensional object data corresponding to a requested context. In addition, the three-dimensional asset may refer to a three-dimensional graphic object that can be overlapped or newly updated on a digital twinned image (or a digital twin map).

The MR AMS client 910 may be included in the MR service apparatus 900.

The MR service apparatus 900 may include a user inter-action handler 901 that generates an action corresponding to a user input and transmits the action to the context manager 901 when the user input is received through the input unit 210 provided in the vehicle.

The user interaction handler 901 may be included in the MR service apparatus 900 or included in the MR AMS client 910.

For example, when a user input of "Find nearby Star-bucks" is received through the input unit 210 of the vehicle, the user interaction handler 901 may generate an action (e.g., "Search POI") corresponding to the user input and transfer the action to the context manager 911 provided in the MR AMS client 910.

As an example, the action may be determined by an action matching a word included in a user input, and the action may be referred to as a command or a control command.

The context manager 911 may generate a command for requesting a context corresponding to an action received from the user interaction handler 901, and transmit the command to the MR AMS server 1100 through the interface API 912.

The command may be generated based on an action (e.g., "Search POI") received from the user interaction handler 901, and as an example, may be defined to include a current location of the vehicle, a type of POI to be found, and radius information (e.g., GET "Starbucks" (type of POI) WITHIN "500m" (radius) FROM "37.7795, −122.4201" (current location of vehicle (latitude, longitude)).

The context manager 911 may receive current scene information currently being output from the vehicle from the scene manager 913, and receive a UX rule from the UX scenario database 914.

Furthermore, the context manager 911 may receive navi-gation information including a current path and a current location from a navigation handler 902 that handles infor-mation of the navigation system 770.

The navigation handler 902 may be provided in the MR service apparatus 900 or may be provided in the MR AMS client 910.

The context manager 911 may generate a command for requesting the context based on at least one of the current scene information, the UX rule, and the navigation infor-mation.

The current scene information may include screen infor-mation currently being displayed on the display 251 of the vehicle. As an example, the current scene information may include information on a mixed reality image in which an MR object and an MR interface are overlapped on a digital twin map.

In addition, at least one of the context manager 911 and the scene manager 913 of the present disclosure may receive sensor data processed through a sensor data adapter 903 that processes information sensed through the sensing unit 120 of the vehicle.

The sensor data adapter 903 may be provided in the MR service apparatus 900 or may be provided in the MR AMS client 910. The sensor data adapter 903 may transmit the processed sensor data to the AR engine handler 904 that handles data transmitted to the AR engine (or AR service apparatus) 800.

The interface API 912 may receive metadata of a context corresponding to the command and/or a three-dimensional asset corresponding to the context from the MR AMS server 1100.

Then, the interface API 912 may transmit the received metadata and/or three-dimensional asset to the scene man-ager 913.

The scene manager 913 may generate UI data using the UX rule received from the UX scenario database 914 and the metadata and three-dimensional asset received from the interface API 912.

Then, the scene manager 913 may transmit the generated UI data to the MR renderer 920 that renders the data to be displayed as a mixed reality (MR) or mixed reality image on the display 251 provided in the vehicle.

Furthermore, the scene manager 913 may further transmit the generated UI data to the AR engine handler 904 config-ured to handle the AR service apparatus 800 provided in the vehicle.

The UX rule stored in the UX scenario database 914 may refer to information on a rule, form, format, or template for generating a screen, UX, or user interface provided by the MR service apparatus, and the UX rule may be predefined for each type of data.

In addition, the UX rule may be updated or modified by a user or an administrator.

Figure 11:
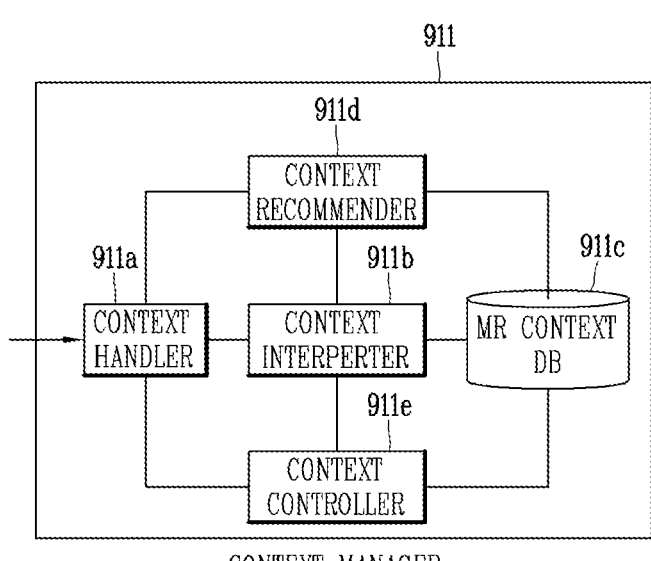
FIG. 11 is a conceptual diagram for explaining a context manager of the present disclosure.

Referring to FIG. 11, the context manager will be described in more detail.

FIG. 11 is a conceptual diagram for explaining a context manager of the present disclosure.

Referring to FIG. 11, the context manager 911 may include a context handler 911a that handles and parses a context request corresponding to a user request, a context interpreter 911b that manages a session for interpreting the context request and generates a context set using a data model, and a context graph database (or MR context data-base) 911c that stores the data model.

Furthermore, the context manager 911 may further include a context recommender 911d that extracts a recom-mendation context based on the generated context set, and a context controller (or context tracker) that manages a con-text to be periodically acquired.

The context manager 911 may be included in the MR AMS client 910 as illustrated in FIG. 9, but is not limited thereto. For example, as illustrated in FIG. 10B, the context manager 911 may be provided in the MR AMS server 1100.

A more detailed operation of the context manager 911 will be described later in more detail when the MR AMS server 1100 is described.

Figure 10B:
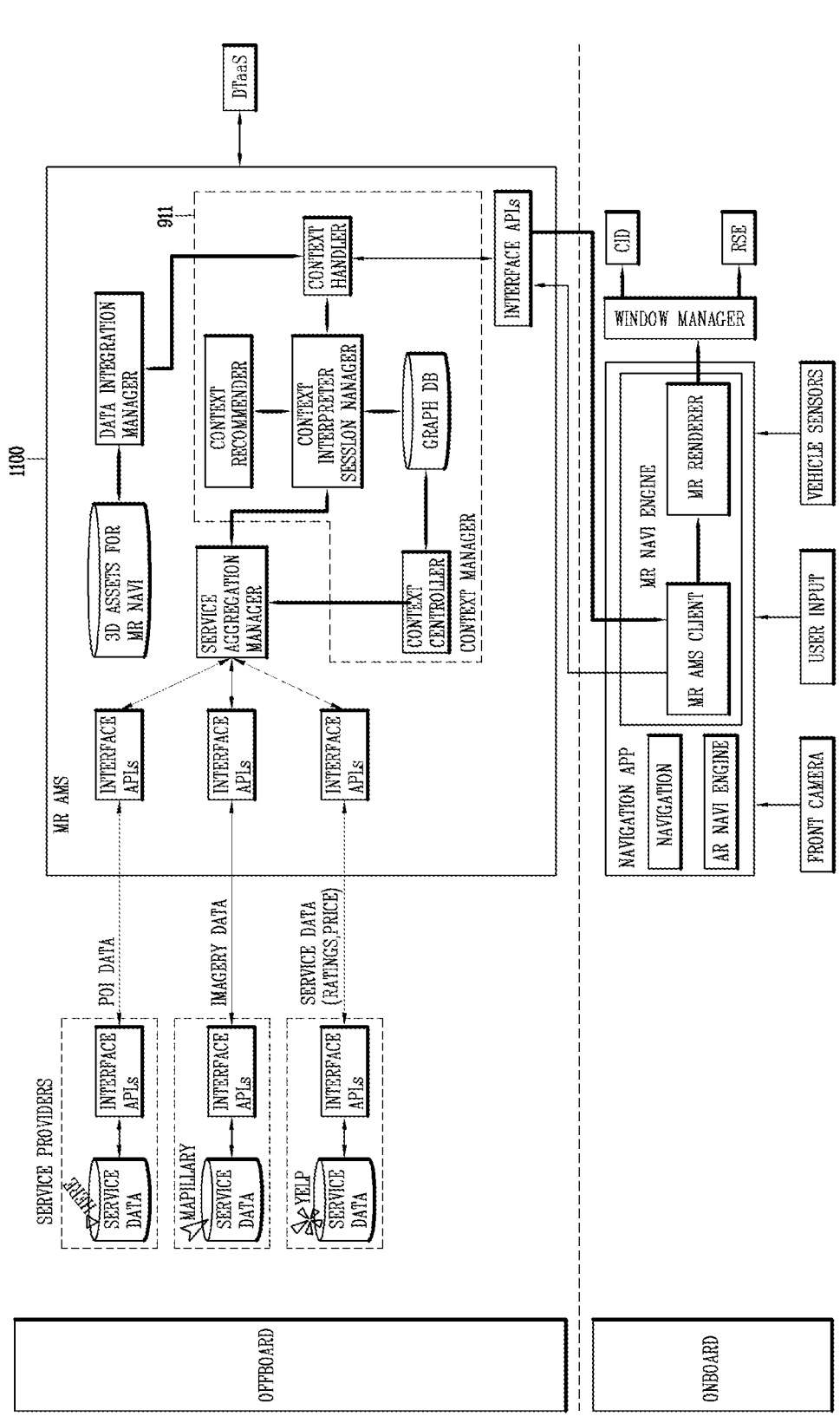

FIGS. 10A and 10B are conceptual diagrams for explain-ing an MR AMS server of the present disclosure.

Referring to FIG. 10A, the MR AMS server 1100 pro-vided outside the vehicle (offboard) to provide a mixed reality automotive meta service (MR AMS) may include an interface API 1101 that calls a function for communicating with the MR AMS client provided in the vehicle, a service aggregation manager 1110 that requests and receives a context corresponding to a request received from the MR AMS client from the service provider, and a data integration manager 1120 that loads a three-dimensional asset corre-sponding to the received context from a database (3D assets for MR navigation database) 1130.

The interface API 1101 may be referred to as a server interface API 1101 to be distinguished from the interface API 912 of the MR AMS client 910 provided in the vehicle.

Furthermore, the interface API 912 of the MR AMS client 910 may be referred to as a vehicle interface API or an MR AMS client interface API.

The interface API 1101 included in the MR AMS server 1100 may transfer a user request (or context request) received from the MR AMS client to the service aggregation manager 1110.

The interface API may include a first interface API 1101 that calls a function for performing communication with the MR AMS client 910, and a second interface API 1102*a*, 1102*b*, 1102*c* in which the service aggregation manager 1110 calls a function for performing communication with the service provider 1300*a*, 1300*b*, 1300*c*.

The second interface API 1102*a*, 1102*b*, 1102*c* may receive service data and/or map data through an interface API provided in the service provider 1300*a*, 1300*b*, 1300*c*.

The second interface API 1102*a*, 1102*b*, 1102*c* and the interface API provided in the service provider 1300*a*, 1300*b*, 1300*c* may perform mutual data transmission and reception, and may include a function defined to convert data format or message format, and may convert data format or message format using such a function to transmit and receive data to and from each other.

The service aggregation manager 1110 may request the requested context from different service providers based on a type of context requested by the MR AMS client 910 provided in the vehicle.

Specifically, the service aggregation manager 1110 may request a first type of context from the first service provider 1300*a* that provides the first type of context when the requested type of the context is the first type of context, and request a second type of context from the second service provider 1300*b* that provides the second type of context when the type of the requested context is the second type of context.

As an example, in a case where the type of the requested context relates to a POI (e.g., "Starbucks"), the service aggregation manager 1110 may request and receive a context for the POI (or POI data) from the first service provider 1300*a* that provides information on the POI.

Furthermore, when the type of the requested context is a view of a certain street, the service aggregation manager 1110 may request and receive a context (or imagery data) for the view of the certain street from the second service provider 1300*b* that provides information on the view of the street.

In addition, when the type of the requested context is a certain service, the service aggregation manager 1110 may request and receive a context related to the service (or data (e.g., service ratings or prices) on the service) from the third service provider 1300*c* that provides information related to the service.

Furthermore, the interface API 1101 may request expanded service API calls from the service aggregation manager 1110 based on the service (or context request) requested by the MR AMS client 910.

The service aggregation manager 1110 may request and receive information corresponding to the expanded service from the service provider 1300*a*, 1300*b*, 1300*c* based on the expanded service API request, and generate a service API using the information and output the generated service API to the data integration manager 1120.

The data integration manager 1120 may perform data enhancement based on the service API received from the service aggregation manager 1110, and generate a metadata package for the requested context to transmit the generated metadata package to the MR AMS client 910 of the vehicle through the interfaces API 1101.

The metadata package may include the three-dimensional asset and service metadata described above. Here, the service metadata may refer to metadata for providing a service corresponding to a requested context.

Meanwhile, the interface API 1101 may transmit a three-dimensional asset loaded from the data integration manager 1120 to the MR AMS client 910.

Meanwhile, as illustrated in FIG. 10B, the MR AMS server 1100 of the present disclosure may further include the context manager 911 described above.

That is, the context manager 911 may be included in the MR AMS client 910 to be provided at a vehicle end, included in the MR AMS server 1100 to be provided at a server (cloud) end, on both sides, or provided at both sides.

When provided in the MR AMS server 1100, the context manager 911 may be configured to manage a context corresponding to a request received from the MR AMS client 910.

As illustrated in FIG. 11, the context manager 911 may include a context handler 911*a* that handles and parses a context request, a context interpreter 911*b* that manages a session for interpreting the context request and generates a context set using a data model, and a context graph database (context graph DB or MR context DB) 911*c* that stores the data model.

Here, the context handler 911*a* may receive a user request input to the MR AMS client through the interface API 1101, and parse the received user request to transmit the parsed user request to the context interpreter 911*b*.

The context interpreter 911*b* may generate a session and then generate a query for a context request corresponding to the user request, and request and receive a context data model corresponding to the query from the context graph database 911*c*.

The context interpreter 911*b* may request a context corresponding to the context data model from the service aggregation manager 1110, and the service aggregation manager 1110 may request and receive context data corresponding to the context data model from the service provider 1300*a*, 1300*b*, 1300*c*.

The service aggregation manager 1110 may request and receive a three-dimensional asset (and/or service meta data) corresponding to the requested context from the data integration manager 1120, and transmit context data received from the service provider and the three-dimensional asset (and/or service metadata) received from the data integration manager to the context interpreter 911*b*.

The context interpreter 911*b* may transmit the received context data and the three-dimensional asset to the MR AMS client 910 provided in the vehicle through the context handler 911*a* and the interface API 1101.

On the other hand, the context manager 911 may further include a context recommender 911*d* that extracts a recommendation context based on the generated context set and a context controller 911*e* (or context tracker) that manages a context to be periodically acquired.

When the completed context data includes information that is unavailable for a specific service, the context recommender 911*d* may request the context interpreter 911*b* to generate a query for recommending a service capable of substituting the specific service.

Figure 12A:
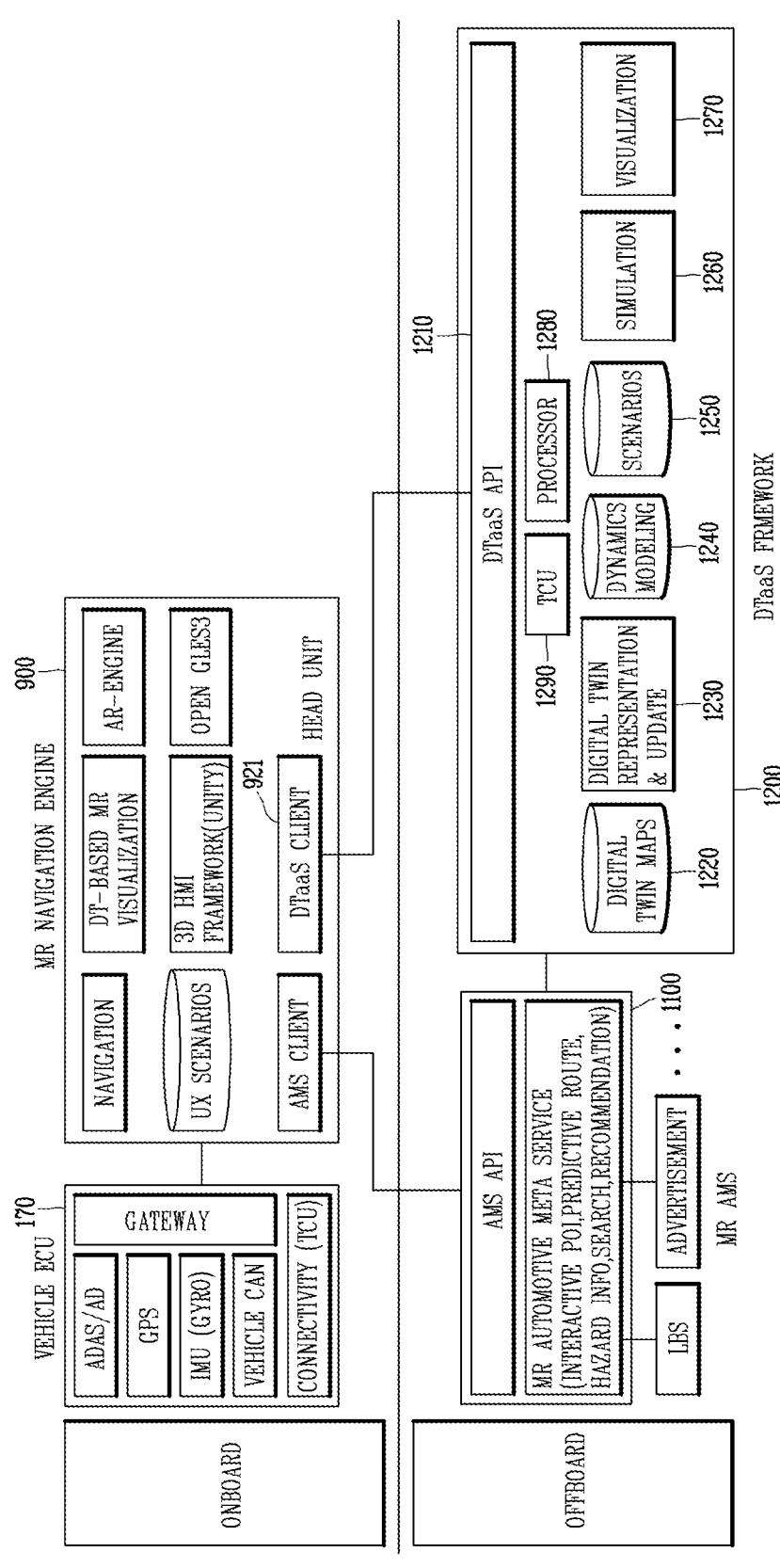
FIGS. 12A and 12B are conceptual diagrams for explaining a DTaaS server of the present disclosure.
Figure 12B:
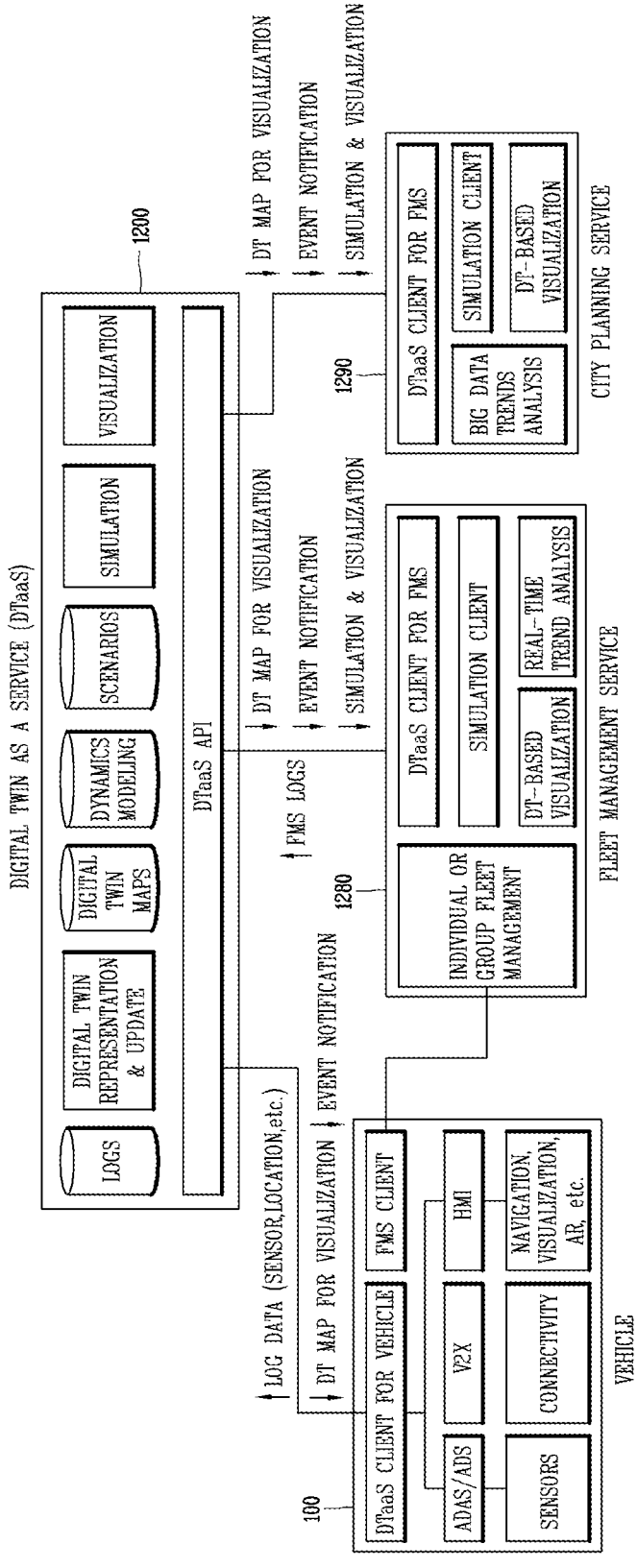

FIGS. 12A and 12B are conceptual diagrams for explaining a DTaaS server of the present disclosure.

Referring to FIG. 12A, the Digital Twin as a Service or Digital Transformation as a Service (DTaaS) server 1200 of the present disclosure may be provided outside the vehicle to provide a mixed reality automotive meta service (MR AMS). Specifically, the DTaaS server 1200 may provide a digital twin map or data (e.g., all types of information on an object overlapping on a three-dimensional polygon map or digital twin) required to generate the digital twin map.

The DTaaS server 1200 may include a DTaaS API 1210 that calls a function for communicating with the MR service apparatus 900 provided in the vehicle, a database (Digital Twins Maps DB) 1220 that stores a digital twin map and a renderable 3D polygon map provided to the MR service apparatus, and a processor 1280 that transmits a three-dimensional polygon map corresponding to location information to the MR service apparatus through the DTaaS API based on the location information of the vehicle received from the MR service apparatus.

In addition, the DTaaS server 1200 may further include a telecommunication unit (TCU) 1290 provided outside the vehicle to perform communication with the MR AMS server 1100 that provides an MR AMS service.

In addition, the DTaaS server 1200 may further include a digital twin map generation unit (digital twin representation and update unit) 1230 that generates a digital twin map by matching an actually captured image to a three-dimensional polygon map stored in the database 1220.

Furthermore, the DTaaS server 1200 may further include a dynamics modeling DB 1240 that stores dynamic information on a moving object received from at least one of the MR service apparatus 900 and the MR AMS server 1100, and a scenario DB 1250 that stores information related to a scenario that can be implemented in a digital twin.

In addition, the DTaaS server 1200 may further include a simulation unit 1260 that performs a simulation corresponding to a user request on the digital twin, and a visualization unit 1270 that visualizes information to be implemented on the digital twin.

All of the above-described elements may be implemented as independent hardware (e.g., a chip or a module), and may also be implemented as blocked components in a software configuration if necessary.

Referring to FIG. 12B, the DTaaS server 1200 may transmit and receive data to and from not only the vehicle 100 but also a server (FMS server) 1280 that provides a fleet management service and a server 1290 that provides a city planning service through the DTaaS API 1210.

As an example, the DTaaS server 1200 may collect log information collected by each server from at least one of the vehicle 100, the FMS server 1280, and the city planning service providing server 1290.

Then, the DTaaS server 1200 may store the collected log information in a log database.

The DTaaS server 1200 may provide a digital twin map for visualization from at least one of the vehicle 100, the FMS server 1280, and the city planning service providing server 1290 based on the collected log information.

In addition, the DTaaS server 1200 may transmit at least one of event notification information, simulation information and visualization information to at least one of the vehicle 100, the FMS server 1280 and the city planning service providing server 1290 based on the received log information.

Figure 13:
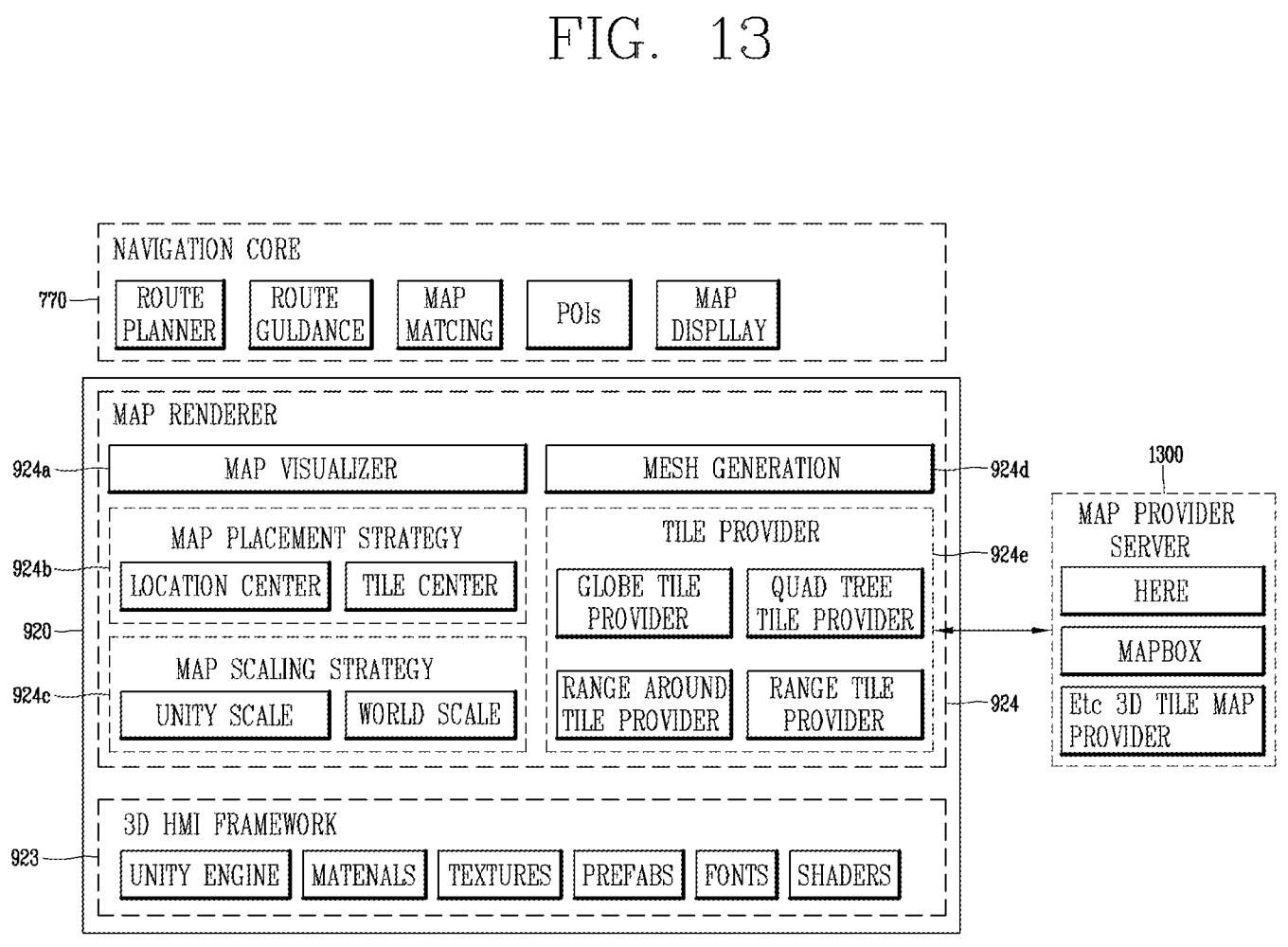

FIG. 13 is a conceptual diagram for explaining an MR renderer of the present disclosure.

First, referring to FIG. 9, the mixed reality (MR) renderer 920 according to an embodiment of the present disclosure may be provided in a vehicle to provide a mixed reality automotive meta service (MR AMS).

The MR renderer 920 may include a DTaaS API 921 that calls a function for communicating with the Digital Twin as a Service (DTaaS) server 1200 that provides at least one of a digital twin map and a three-dimensional polygon map.

Furthermore, the MR renderer 920 may include the visualization unit (DT-based MR Visualization Unit) 922 that receives UI data from the MR AMS client 910, and visualizes a mixed reality image using a three-dimensional polygon map received from the DTaaS API 921 and the UI data.

In addition, the MR renderer 920 may include a three-dimensional (3D) human-machine interface (HMI) framework 923 that generates a three-dimensional human-machine interface (HMI) to allow a user-operable interface to be included in the mixed reality image.

The three-dimensional HMI framework 923 may overlap the interface (e.g., a user-operable interface, or an interface (graphic object) implemented in the form of MR) with the mixed reality image generated by the MR visualization unit 922.

Then, the mixed reality image in which the interface overlaps may be transmitted to a window manager 930 provided in the vehicle to display the mixed reality image in which the interface overlaps on the display 251 provided in the vehicle.

The window manager 930 may perform a role of controlling an image generated by the MR renderer 920 to be displayed on any one of the displays 251 provided in the vehicle.

In addition, the window manager 930 may display at least one of a mixed reality image transmitted from the MR renderer 920 and a camera image in which AR information transmitted from the augmented reality (AR) service apparatus 800 overlaps on the display 251 provided in the vehicle.

The UI data transmitted from the MR AMS client 910 may include a camera image captured by a vehicle camera and information related to an object related to an MR service (e.g., MR service data received from the MR AMS server 1100 or a three-dimensional asset).

The MR visualization unit 922 may generate a digital twin map by matching an image extracted from a camera image included in the UI data on the three-dimensional polygon map.

Then, the MR visualization unit 922 may generate the mixed reality image by overlapping the object related to the MR service on the digital twin map.

The mixed reality image (or MR image) may be defined by overlapping several images existing in a real world based on a digital twinned digital world, and may include a user-operable interface.

The MR visualization unit 922 may periodically receive the UI data from the MR AMS client 910, and update an object related to the MR service on the mixed reality image using the received UI data.

As illustrated in FIG. 13, the three-dimensional HMI framework may store information on a unity engine, materials, textures, prefabs, fonts, and shaders for generating an interface, and generate an interface to be overlapped on a mixed reality image using the information and overlap the generated interface with the mixed reality image.

Meanwhile, as illustrated in FIG. 13, the MR renderer 920 may further include a map renderer 924 configured to render a map.

The map renderer 924 may receive map data from a map provider 1300.

The map renderer 924 may include a map visualization unit 924a that visualizes a map, a map placement strategy unit 924b, a map scaling strategy unit 924c, a mesh generation unit 924d, and a tile provider 924e.

The map visualization unit 924a may perform a role of visualizing a map using the received map data.

The map placement strategy unit 924*b* may place a map based on a location of a vehicle or place a map based on a tile.

The map scaling strategy unit 924*c* may unite the scale (unity scale) or change the scale to a world scale.

The mesh generation unit 924*d* may partition the map into meshes having a predetermined size or generate map data having a predetermined area.

The tile provider 924*e* may provide at least one of a globe tile, a quad tree tile, a range around tile, and a range tile.

The MR renderer 920 may generate a necessary mixed reality image (MR image) based on information such as a current location of the vehicle, path information, a path plan, and a POI provided by the navigation system 770, and provide the MR image to the display 251 of the vehicle.

Hereinafter, a method of providing an MR service in the MR service platform of the present disclosure will be described in more detail with reference to the accompanying drawings.

FIGS. 14, 15, 16, 17, 18, 19 and 20 are flowcharts and conceptual diagrams for explaining a method for providing an MR automotive meta service according to an embodiment of the present disclosure.

Referring to FIG. 14, the MR service apparatus 900 of the present disclosure may receive a user input through the user input unit 210 provided in a vehicle, or receive an event and environment recognition from at least one of the sensing unit 120, the navigation system 770, and the controller 170 provided in the vehicle (S1410).

In this case, the context manager 912 of the MR AMS client 910 included in the MR service apparatus 900 may interpret at least one of the received user input, event, and environment recognition, and then find an MR context and recommend a service related thereto (S1420).

As an example, the related service may be recommended through the context interpreter 911*b* and/or the context recommender 911*d* of the context manager.

The MR AMS client 910 may transmit the recommended related service to the MR AMS server 1100 provided outside the vehicle through the interface API 912.

The service aggregation manager 1110 provided in the MR AMS server 1100 may acquire the metadata of a recommended service (S1430).

As an example, the metadata of the service may be acquired from the service provider 1300*a*, 1300*b*, 1300*c*.

Then, the data integration manager 1120 may retrieve a three-dimensional asset corresponding to the metadata of the service from the database 1130 (S1440).

Then, the data integration manager 1120 may transmit the retrieved three-dimensional asset and the metadata of the service to the MR AMS client 910 provided in the vehicle through the interface API 1101.

The MR AMS client 910 may generate UI data using the received service metadata and three-dimensional asset, and transmit the generated UI data to the MR renderer 920.

The MR renderer 920 may render the received UI data mixed reality image. Specifically, the MR renderer 920 may render a three-dimensional asset using service metadata included in the UI data (S1450).

An MR context management rule of the context manager 911 will be described with reference to FIGS. 15 and 16.

Referring to FIG. 15, there may exist two root objects such as MR automotive metadata and an MR context in the MR context database (or context graph database) 911*c*.

Figure 16:
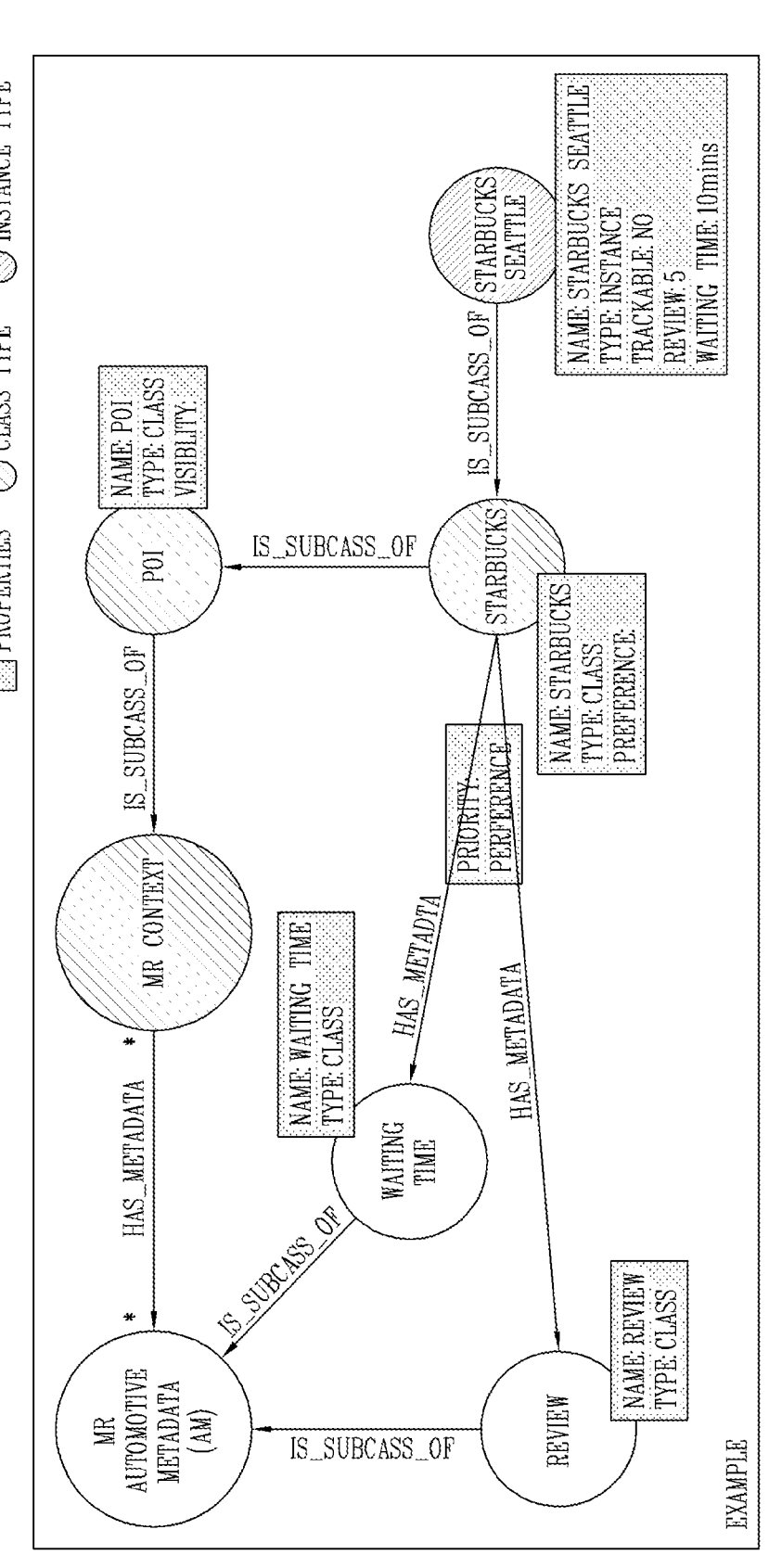

Referring to FIG. 16, a user input, an event, an environment, and the like may be linked to a subclass of the MR context.

Service metadata to be reviewed and recommended may be linked to a subclass of the MR automotive metadata.

Between the nodes of MR Context and MR Automotive Metadata, as an example, the name of HAS_METADATA is connected, and the following priority may be specified.

PriorityLevel: A service priority can be specified as an attribute and may be used as a priority when acquiring a service.

PreferenceLevel: A numerical value of a user's individual preference can be used for a user-customized expression during rendering.

MR Context may be instantiated (instance type) using a relation of IS_INSTANCE_OF, and an actual primitive value can be stored as a priority.

All MR Automotive Metadata connected to its own class can be imported as a priority key while instantiating.

Instance Type has a trackable priority and can be updated periodically in the Context Controller if TRUE.

The context management method will be described as follows, and the present disclosure may use a graph data model for context management.

Furthermore, the present disclosure may define a data instance as a node, an attribute of a node as a property, and define a directional relation between nodes. In the present disclosure, a context may be acquired through a graph data query, and a node may be set to an active node or a passive node according to a data acquisition method. The active node, which is a node that periodically acquires a context, may be managed by a Context Tracker (context controller), and may be set by a developer. The passive node may be a context node requested by a user input.

A node may have a source property (priority) when it needs to make a request to a service to acquire data.

For example, when the corresponding context node needs to be retrieved from a yelp review, a source may be specified as a key and a yelp review as a value.

Data modeling for a basic scenario may be initially set, and a context acquired during runtime may be updated and managed.

An example of retrieving a nearby POI will be described with reference to FIG. 17.

First, the MR AMS client 910 may receive a user input to find a nearby POI (e.g., "Starbucks") (S1710).

In this case, the context manager 911 may interpret the received user input, find the requested POI (Starbucks), and request a recommendation service (or POI-related information (context)) including a review, a waiting time, and the like, from the MR AMS server 1100 (S1720).

The service aggregation manager 1110 of the MR AMS server 1100 may request and receive a requested recommendation service (or a requested context) from the service provider 1300*a*, 1300*b*, 1300*c* (S1730).

Then, the data integration manager 1120 of the MR AMS server 1100 may retrieve a three-dimensional asset corresponding to the review and waiting time of a POI (Starbucks) corresponding to the acquired service metadata from the database 1130 (S1740).

Then, the data integration manager 1130 may transmit the service metadata and the three-dimensional asset retrieved through the interface API 1101 to the MR AMS client 910 provided in the vehicle (S1750).

Meanwhile, when the context manager 911 is provided in the MR AMS server 1100, data may be processed through the following flow.

First, when a user input such as "Find POI" is received through the user input unit 210 of the vehicle, the MR AMS client 901 may request a "Find POI" context from the context handler 911a through the interface API 912.

The context handler 911a may parse the user input and then transmit the parsed user input to the context interpreter 911b, and the context interpreter 911b may generate a session to the context graph database 911c and then generate and request a query for a "Find POI"-related context request.

The context graph database 911c may transmit a context data model corresponding to the query to the context interpreter 911b.

The context interpreter 911b may make a service request to the service aggregation manager 1110 to acquire an empty context of the context data model.

The service aggregation manager 1110 may request and acquire context data (service metadata) from the service provider 1300a, 1300b, 1300c.

The service aggregation manager 1110 may transmit the acquired context data (service metadata) to the data integration manager 1120 to request and receive a three-dimensional asset for the requested context (recommendation service).

The service aggregation manager 1110 may transfer context data (service metadata) and the three-dimensional asset to the context interpreter 911b, and end the session.

Then, the context data may be transmitted to the MR AMS client 910 provided in the vehicle through the context interpreter 911b, the context handler 911a, and the interface API 1101.

FIG. 18 is a flowchart for explaining an example of a service that can be provided by the MR service platform when a parking lot is full.

First, when it is determined that the state of a destination parking lot of the vehicle set in the MR AMS client is full, the MR AMS server 1100 may transmit service metadata in which the state of the parking lot is not available (Parking Lot: Not Available) to the MR AMS client 910 (S1810).

Then, the context recommender 911d included in the context manager 911 of the vehicle may request the display 251 of the vehicle to display a pop-up asking the user whether to recommend a parking lot (S1820).

When there is a user approval (permission) through a pop-up window, the context recommender 911d may retrieve a context of a name of the parking lot (MR Context) from the MR Context DB 911c, and transmit a service connected to the retrieved context to the MR AMS server 1100 (S1830).

Then, the service aggregation manager 1110 may acquire service metadata for the connected service from the service provider, and the data integration manager 1120 may retrieve a three-dimensional asset corresponding to the service metadata from the database 1130 to transfer the retrieved 3D asset to the MR AMS client 910 (S1840).

In summary, the context recommender 911d may make a request to generate a query when a parking lot node is full in the context data completed by the context interpreter 911b.

Then, the context interpreter 911b may generate a session to the context graph database 911c, and then request a query from the DB to see whether there is other parking lot data in a closed relation with the parking lot after the generation of the query.

The context interpreter 911b may request a service from the service aggregation manager 1110 to acquire a state of a corresponding context when there is other parking lot data in a closed relation.

The service aggregation manager 1110 may request and receive a three-dimensional asset for recommendation from the data aggregation manager 1120 when the state is available, and transfer the context data and the three-dimensional (3D) asset to the context interpreter 911b and end the session.

Then, the context data and the three-dimensional asset may be transmitted to the MR AMS client 910 provided in the vehicle through the context interpreter 911b, the context handler 911a, and the interface API 1101.

FIG. 19 is a flowchart for explaining an example of expressing a POI in a preview environment.

First, the context manager 911 may recognize an environment in which the MR service mode of the vehicle is a preview mode (S1910).

The context manager 911 may find a service related to a POI-related context (MR Context), and transfer the found context and current path information together to the MR AMS server 1100 (S1920).

The service aggregation manager 1110 may acquire service metadata corresponding the requested context from the service provider, and the data integration manager 1120 may find a three-dimensional asset corresponding to the service metadata to transfer the found 3D asset to the MR AMS client 910 (S1930).

Then, the MR AMS client 910 may transmit UI data including the service metadata and the three-dimensional asset to the MR renderer 920, and the MR renderer 920 may render a preview screen using the UI data (S1940).

FIG. 20 is a flowchart for explaining an example of using a preference.

The context manager 911 may acquire a nearby POI list (S2010).

When the preference of an MR Context for the nearby POI list is high (when the preference is higher than a predetermined reference), the context recommender 911d may find a related service of the context (MR Context) having a high preference transmitted to the MR AMS server 1100 to transmit the related service along with the location information (S2020).

The service aggregation manager 1110 may acquire service metadata corresponding the requested context from the service provider, and the data integration manager 1120 may find a three-dimensional asset corresponding to the service metadata to transfer the found 3D asset to the MR AMS client 910 (S2030).

Then, the MR AMS client 910 may transmit UI data including the service metadata and the three-dimensional asset to the MR renderer 920, and the MR renderer 920 may render a preview screen using the UI data (S2040).

Figure 21:
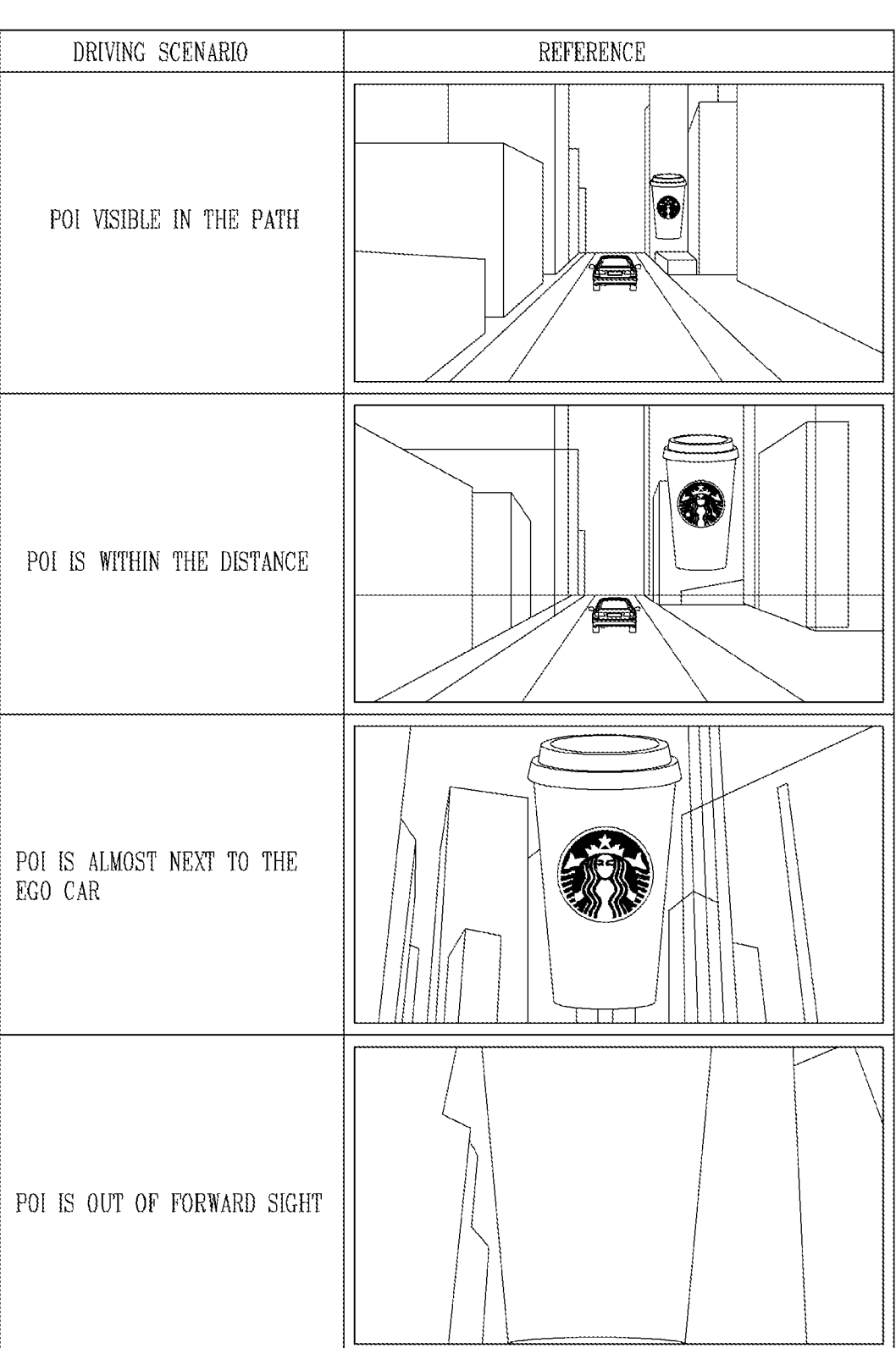
Figure 22:
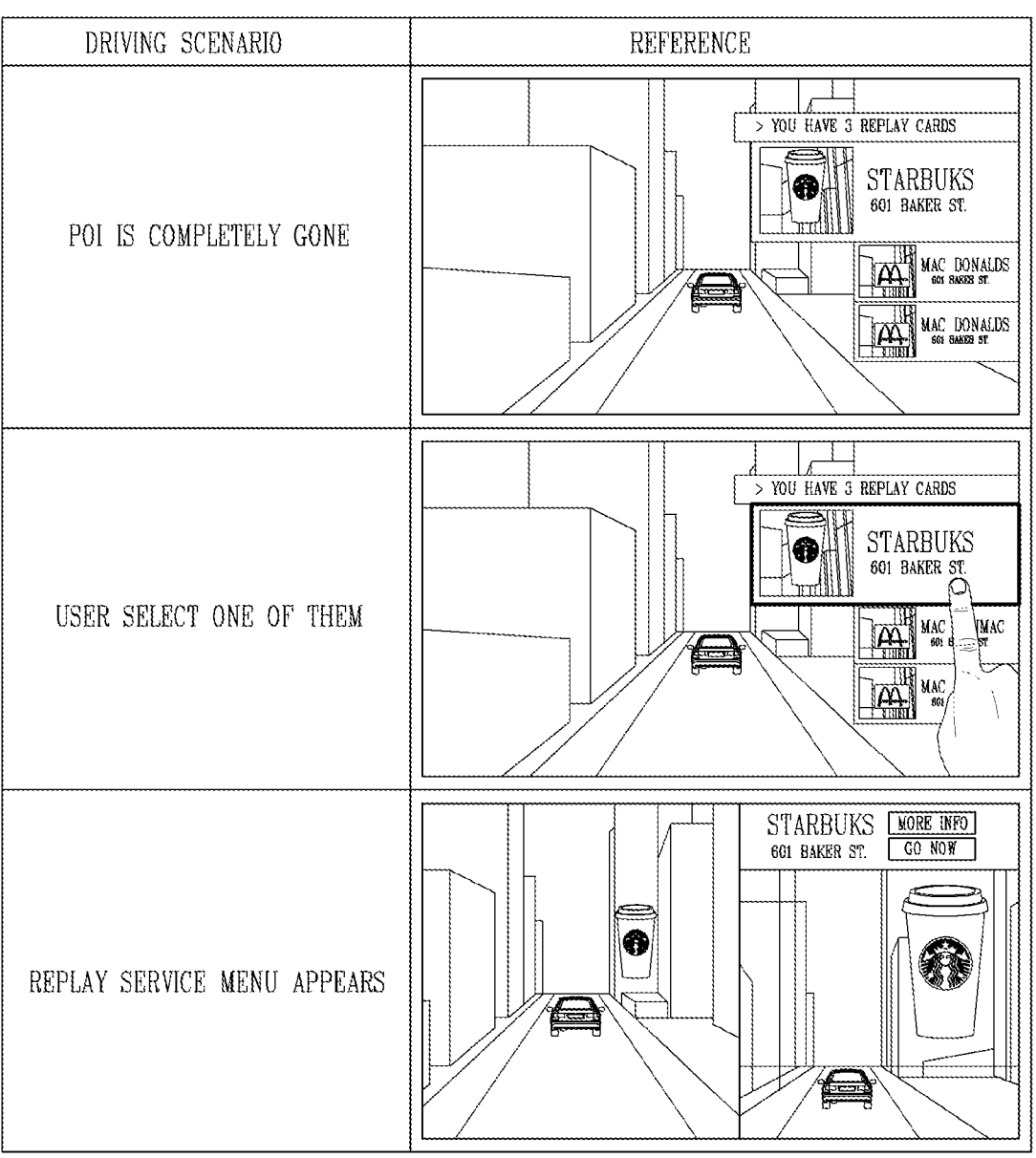

FIGS. 21, 22 and 23 are conceptual diagrams for explaining an MR service providing screen according to an embodiment of the present disclosure.

Referring to FIGS. 21 and 22, a mixed reality image generated by the above-described MR service platform may be displayed on the display 251 of the vehicle.

When a 3D POI is displayed on a path, a main camera may be controlled to intentionally keep looking at a POI until the POI is invisible.

Once the vehicle passes the POI, a thumbnail from a primary camera may be captured and added as a new replay card.

Previous replay cards may be stacked in a time sequence, and when the user selects a card, the captured POI scene may be replayed in a different color style.

A POI service menu may be displayed together for an additional service interaction.

Such control may be operated and controlled by the MR service apparatus 900.

Referring to FIG. 23, an MR service provided by the MR service platform of the present disclosure may enhance POI visibility compared to an AR mode in which an augmented reality object overlaps with a real world.

A POI is displayed as a floating icon in the case of the AR mode, whereas there is no occlusion (covered part), and an accurate and realistic POI can be localized as if it were actually there, and the POI can be identified even from a long distance in the case of displaying the POI in MR.

Accordingly, the MR service platform of the present disclosure may place all renderable POI content in a digital twin world.

In addition, the MR service platform of the present disclosure may allow accurate POI positioning without occlusion, and provide an MR interface (or mixed reality image) that flies to a corresponding POI in a movie motion when a remote user touches a POI object.

The MR service platform of the present disclosure may intentionally adjust a viewing angle for advertisement when there is a POI that has entered into a premium partnership with an additional information panel pop-up that provides a POI-related meta service.

The MR service platform of the present disclosure may allow infinite POI content rendering in any environment to support a user to intuitively retrieve a POI, thereby preventing further confusion from occurring.

According to an embodiment of the present disclosure, there is one or more of the following effects.

First, according to the present disclosure, it may be possible to provide an MR service platform capable of providing an optimized MR service or a mixed reality automotive meta service to a passenger who is onboard a vehicle.

Second, according to the present disclosure, it may be possible to provide an MR service platform capable of providing information corresponding to a user request in the form of MR using an optimized method.

Third, according to the present disclosure, it may be possible to provide an MR service platform capable of providing an MR interface optimized in consideration of a current state of the vehicle to a user.

The effects of the present disclosure may not be limited to the above-mentioned effects, and other effects not mentioned herein may be clearly understood by those skilled in the art from the description of the claims.

Hereinafter, the AR service apparatus 800 of the present disclosure will be described in brief.

The AR service apparatus 800 of the present disclosure may vary information provided as an AR service based on the environment of the vehicle.

That is, the AR service apparatus 800 of the present disclosure may dynamically adjust (vary) information to be displayed in AR and an amount of the information according to an environment of the vehicle, and select information to be emphasized.

Furthermore, the AR service platform of the present disclosure may control an AR service provided by the vehicle to vary according to a specific condition, such as a vehicle environment and an advertisement exposure condition.

In the case of AR navigation in the related art, when displaying a destination or a major point of interest (POI) in AR navigation, it is difficult to reflect the latest information because information stored in map data is used, and there is a limitation in that the POI including real-time attributes cannot be provided therein.

On the contrary, the AR service platform of the present disclosure may fuse location information of a vehicle, map information, a plurality of sensor data, real-time POI information, advertisement/event information, and the like, and display them in AR navigation.

As an example, in order to display AR information, the AR service apparatus 800 of the present disclosure may receive AR service information from a server based on a current location of the vehicle and navigation path/guide information, and process the AR service information into a form that can be on an AR navigation screen.

As an example, the AR service apparatus 800 of the present disclosure may reconfigure real-time AR display information. The AR service apparatus 800 may determine a display format, a size, a location, an exposure method, and the like, of AR content in consideration of a driving environment to reconfigure service data received from a server to be displayed on the AR navigation screen (e.g., POI exposure location and size variation according to a driving speed, service information exposure location change, AR wall display location, exposure time adjustment according to a traffic environment, etc.).

Furthermore, the AR service apparatus 800 of the present disclosure may analyze an exposure frequency of AR display information through user feedback.

The server 900 may collect user input information (input information such as a touch and an order) on AR service content, perform a content exposure frequency analysis, and adjust a service content exposure policy based on the information.

Through this configuration, the present disclosure may allow expression in AR navigation by fusing various external service content to provide various services through POI information including real-time properties real-time attributes.

Furthermore, according to the present disclosure, various types of AR content such as an advertisement, an event, and major landmark information as well as POI information may be displayed.

In addition, a new user experience of AR navigation may be presented through a UX scenario-based embodiment proposed in the present disclosure.

The present disclosure may provide a service platform structure and an AR information display method (UX) that dynamically adjusts an amount of information (POI data, advertisements) to be displayed in AR according to a vehicle environment and an advertisement exposure condition, a module that collects POI information and commerce service information for AR expression and processes the information into a form that is easy to render in an AR engine, a module that processes specific POI information to be emphasized according to an environment an inside/outside of the vehicle, a module that collects vehicle environment information and applies a UX policy according to the environment, and an AR engine module that renders an AR object (a group POI, a mini POI, a 3D object, an event wall, etc.) according to the UX policy.

Moreover, the present disclosure may provide a client module that transmits and receives an interaction and data between front and rear seats of the vehicle, a service app module that exposes commerce service information in association with POI, a client module that collects user actions for advertisements, such as AR advertisement object exposure results and clicks, and a cloud module that collects/ analyzes user actions for advertisements such as AR advertisement object exposure results and clicks.

The MR service apparatus 900 and the AR service apparatus 800 described above may be included in the vehicle 100.

Furthermore, the operation or control method of the MR service apparatus 900 and the AR service apparatus 800 described above will be analogically applied to the operation or control method of the vehicle 100 (or controller 170) in the same or similar manner.

The foregoing present disclosure may be implemented as codes readable by a computer on a medium written by the program. The computer-readable media may include all kinds of recording apparatuses in which data readable by a computer system is stored. Examples of the computer-readable media may include ROM, RAM, CD-ROM, magnetic tape, floppy disk, and optical data storage apparatus, and the like. In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

The invention claimed is:

1. A mixed reality automotive meta service (MR AMS) server for providing an MR AMS in which augmented reality (AR) and virtual reality (VR) are mixed, the MR AMS server comprising:

an interface API that calls a function for communicating with an MR AMS client provided in a vehicle;

a service aggregator that requests and receives a context corresponding to a request received from the MR AMS client from a service provider; and a data integrator that loads a three-dimensional asset corresponding to the received context from a database, wherein the service aggregator requests information corresponding to the requested context from different service providers based on the context requested by the MR AMS client disposed in the vehicle, and the interface API transmits a three-dimensional asset corresponding to the context to the MR AMS client, such that an object associated with an MR service is overlaid on a digital twin map, the digital twin map generated by matching an image extracted from a camera image captured through a camera of the vehicle with a three-dimensional polygon map, and wherein the interface API comprises:

a first interface API that calls a function for performing communication with the MR AMS client; and a second interface API that calls a function for allowing the service aggregator to perform communication with the service provider.

2. The MR AMS server of claim 1, wherein the interface API transfers a user request received from the MR AMS client to the service aggregator.

3. The MR AMS server of claim 1, wherein the three-dimensional asset is three-dimensional object data corresponding to the requested context, and is capable of being updated by being overlaid on the digital twin map.

4. The MR AMS server of claim 1, wherein the service aggregator requests a first type of context from a first service provider that provides the first type of context when the type of the requested context is the first type of context, and requests a second type of context from a second service provider that provides the second type of context when the type of the requested context is the second type of context.

5. The MR AMS server of claim 1, wherein the interface API transmits to the MR AMS client, metadata including at least one of service metadata for providing the MR service and the three-dimensional asset.

6. The MR AMS server of claim 1, further comprising:

a context requestor that manages a context corresponding to the request received from the MR AMS client.

7. The MR AMS server of claim 6, wherein the context requestor comprises:

a context handler that handles and parses a context request;

a context interpreter that manages a session for interpreting a context request, and generates a context set using a data model; and a context graph database that stores the data model.

8. The MR AMS server of claim 7, wherein the context handler receives a user request input to the MR AMS client through the interface API, and parses the received user request to transmit the parsed user request to the context interpreter.

9. The MR AMS server of claim 8, wherein the context interpreter generates a session and then generates a query for a context request corresponding to the user request, and requests and receives a context data model corresponding to the query from the context graph database.

10. The MR AMS server of claim 9, wherein the context interpreter requests a context corresponding to the context data model from the service aggregator, and the service aggregator requests and receives context data corresponding to the context data model from the service provider.

11. The MR AMS server of claim 10, wherein the service aggregator requests and receives a three-dimensional asset corresponding to the requested context from the data integrator, and transmits the context data received from the service provider and the three-dimensional asset received from the data integrator to the context interpreter.

12. The MR AMS server of claim 11, wherein the context interpreter transmits the received context data and a 3D asset to the MR AMS client provided in the vehicle through the context handler and the interface API.

13. The MR AMS server of claim 10, wherein the context requestor further comprises:

a context recommender that extracts a recommendation context based on the generated context set; and a context controller that manages a context to be periodically acquired.

14. The MR AMS server of claim 13, wherein when the context data comprises information that is unavailable for a specific service, the context recommender requests the context interpreter to generate a query for recommending a service capable of substituting the specific service.

\* \* \* \* \*